US012100896B2

(12) United States Patent
Leung et al.

(10) Patent No.: US 12,100,896 B2
(45) Date of Patent: Sep. 24, 2024

(54) HORN ANTENNA AND LENS FOR HORN ANTENNA

(71) Applicant: City University of Hong Kong, Kowloon (HK)

(72) Inventors: Kwok Wa Leung, Kowloon (HK); Zhiyi Zhang, Kowloon (HK); Kai Lu, Guangzhou (CN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 17/943,358

(22) Filed: Sep. 13, 2022

(65) Prior Publication Data

US 2024/0097345 A1 Mar. 21, 2024

(51) Int. Cl.
*H01Q 19/08* (2006.01)

(52) U.S. Cl.
CPC .................................. *H01Q 19/08* (2013.01)

(58) Field of Classification Search
None
See application file for complete search history.

(56) References Cited

U.S. PATENT DOCUMENTS 3,474,454 A * 10/1969 Kempic .................. H01Q 3/38 333/24 R
5,323,169 A * 6/1994 Koslover .............. H01Q 21/08 333/136
7,667,666 B2 2/2010 Chang et al.
7,760,129 B1 * 7/2010 Knight .................... G01S 7/025 342/188
8,384,600 B2 2/2013 Huang et al.
8,730,125 B2 5/2014 De Flaviis et al.
9,966,658 B2 5/2018 Fitz-Coy et al.
10,008,776 B2 6/2018 Chen et al.
10,116,061 B2 10/2018 Artemenko et al.
10,230,170 B1 * 3/2019 Boulais .................. H01Q 13/02
10,256,551 B2 4/2019 Shehan
2018/0123254 A1 * 5/2018 Wu .......................... H01Q 1/38

OTHER PUBLICATIONS

D. Kraus, "Antennas: For All Applications", 1988, McGraw-Hill, Chapter 17 (Year: 1988).*
T. A. Elwi, "A miniaturized folded antenna array for MIMO applications," Wirel. Pers. Commun., vol. 98, No. 2, pp. 1871-1883, Jan. 2018.

(Continued)

*Primary Examiner* — Dameon E Levi
*Assistant Examiner* — Anh N Ho
(74) *Attorney, Agent, or Firm* — Renner, Kenner, Greive, Bobak, Taylor & Weber

(57) ABSTRACT

A lens for a horn antenna and a horn antenna including the lens. The lens includes a generally flared plate assembly extending generally along an axis from a first side to a second side opposite the first side. The generally flared plate assembly defines a plurality of non-linear channels that are operable to manipulate an electromagnetic wave received at the first side to provide a manipulated electromagnetic wave at the second side.

27 Claims, 27 Drawing Sheets

(56) References Cited

OTHER PUBLICATIONS

Y. Hu, W. Hong, and Z. H. Jiang, "A multibeam folded reflectarray antenna with wide coverage and integrated primary sources for Millimeter-Wave massive MIMO applications," IEEE Trans. Antennas Propag., vol. 66, No. 12, pp. 6875-6882, Dec. 2018.
Z.-W. Miao, Z.-C. Hao, Y. Wang, B.-B. Jin, J.-B. Wu, and W. Hong, "A 400-GHz high-gain quartz-based single layered folded reflectarray antenna for terahertz applications," IEEE Trans. Terahertz Sci. Technol., vol. 9, No. 1, pp. 78-88, Jan. 2019.
X.-C. Zhu, P.-P. Zhang, Y.-X. Zhang, J.-X. Ge, and Z.-H. Gao, "A high-gain filtering antenna based on folded reflectarray antenna and polarization-sensitive frequency selective surface," IEEE Antennas Wirel. Propag. Lett., vol. 19, No. 8, pp. 1462-1465, Aug. 2020.
Y. Ge, C. Lin, and Y. Liu, "Broadband folded transmitarray antenna based on an ultrathin transmission polarizer," IEEE Trans. Antennas Propag., vol. 66, No. 11, pp. 5974-5981, Nov. 2018.
J. Yang et al., "Folded transmitarray antenna with circular polarization based on metasurface," IEEE Trans. Antennas Propag., vol. 69, No. 2, pp. 806-814, Feb. 2021.
G.-B. Wu, S.-W. Qu, and S. Yang, "Low-profile transmitarray antenna with Cassegrain reflectarray feed," IEEE Trans. Antennas Propag., vol. 67, No. 5, pp. 3079-3088, May 2019.
H. Jin, W. Che, K.-S. Chin, G. Shen, W. Yang, and Q. Xue, "60-GHz LTCC differential-fed patch antenna array with high gain by using soft-surface structures," IEEE Trans. Antennas Propag., vol. 65, No. 1, pp. 206-216, Jan. 2017.
J. Zhu, C.-H. Chu, L. Deng, C. Zhang, Y. Yang, and S. Li, "mm-Wave high gain cavity-backed aperture-coupled patch antenna array," IEEE Access, vol. 6, pp. 44050-44058, 2018.
Y. Li et al., "3-D printed high-gain wideband waveguide fed horn antenna arrays for millimeter-wave applications," IEEE Trans. Antennas Propag., vol. 67, No. 5, pp. 2868-2877, May 2019.
K. Fan, Z.-C. Hao, Q. Yuan, G. Q. Luo, and W. Hong, "A wideband high-gain planar integrated antenna array for E-band backhaul applications," IEEE Trans. Antennas Propag., vol. 68, No. 3, pp. 2138-2147, Mar. 2020.
T. J. Cui, D. Smith, and R. Liu, Eds., Metamaterials: Theory, Design, and Applications. Springer US, 2010.
K. Mavrakakis, H. Luyen, J. H. Booske, and N. Behdad, "Wideband transmitarrays based on polarization-rotating miniaturized-element frequency selective surfaces," IEEE Trans. Antennas Propag., vol. 68, No. 3, pp. 2128-2137, Mar. 2020.
T. Cai et al., "High-performance bifunctional metasurfaces in transmission and reflection geometries," Adv. Opt. Mater., vol. 5, No. 2, p. 1600506, 2017.
Y. He, N. Ding, L. Zhang, W. Zhang, and B. Du, "Short-length and high-aperture-efficiency horn antenna using low-loss bulk anisotropic metamaterial," IEEE Antennas Wirel. Propag. Lett., vol. 14, pp. 1642-1645, 2015.
K. Liu, Y. Ge, and C. Lin, "A compact wideband high-gain metasurface-lens-corrected conical horn antenna," IEEE Antennas Wirel. Propag. Lett., vol. 18, No. 3, pp. 457-461, Mar. 2019.
J. P. Balthasar Mueller, N. A. Rubin, R. C. Devlin, B. Groever, and F. Capasso, "Metasurface polarization optics: independent phase control of arbitrary orthogonal states of polarization," Phys. Rev. Lett., vol. 118, No. 11, p. 113901, Mar. 2017.
Y.-X. Zhang, Y.-C. Jiao, and S.-B. Liu, "3-D-printed comb mushroom-like dielectric lens for stable gain enhancement of printed log-periodic dipole array," IEEE Antennas Wirel. Propag. Lett., vol. 17, No. 11, pp. 2099-2103, Nov. 2018.
Z. Qi, X. Li, J. Xiao, and H. Zhu, "Dielectric-slab-loaded hollow substrate-integrated waveguide h-plane horn antenna array at Ka-band," IEEE Antennas Wirel. Propag. Lett., vol. 18, No. 9, pp. 1751-1755, Sep. 2019.
M. K. T. Al-Nuaimi, W. Hong, and Y. Zhang, "Design of high-directivity compact-size conical horn lens antenna," IEEE Antennas Wirel. Propag. Lett., vol. 13, pp. 467-470, 2014.
N. Zhang, W. X. Jiang, H. F. Ma, W. X. Tang, and T. J. Cui, "Compact high-performance lens antenna based on Impedance-matching gradient-index metamaterials," IEEE Trans. Antennas Propag., vol. 67, No. 2, pp. 1323-1328, Feb. 2019.
L. Wang, X. Yin, S. Li, H. Zhao, L. Liu, and M. Zhang, "Phase corrected substrate integrated waveguide h-plane horn antenna with embedded metal—via arrays," IEEE Trans. Antennas Propag., vol. 62, No. 4, pp. 1854-1861, Apr. 2014.
Wang, M. Esquius-Morote, H. Qi, X. Yin, and J. R. Mosig, "Phase corrected H-plane horn antenna in gap SIW technology," IEEE Trans. Antennas Propag., vol. 65, No. 1, pp. 347-353, Jan. 2017.
X. Zhao et al., "All-metal beam steering lens antenna for high power microwave applications," IEEE Trans. Antennas Propag., vol. 65, No. 12, pp. 7340-7344, Dec. 2017.
J. D. Kraus, Antennas. McGraw-Hill, Chapters 8, 9, 17, and 19, 1988.
C. A. Balanis, Antenna Theory: Analysis and Design, 4th ed. New York: Wiley, Chapeters 2, 13, and 17, 2016.
H. W. Tian, W. X. Jiang, X. Li, Z. P. Chen, and T. J. Cui, "An ultra-wideband and high-gain antenna based on three-dimensional impedance-matching metamaterial lens," IEEE Trans. Antennas Propag., vol. 69, No. 6, pp. 3084-3093, Jun. 2021.

* cited by examiner

*E*-plane (*x*-*y* plane)

*H*-plane (*x*-z plane)

2100

*E*-plane (*x*-*y* plane)

*H*-plane (*x*-*z* plane)

*E*-plane (*x*-*y* plane)

*H*-plane (*x*-*z* plane)

*H*-plane (*x*-*z* plane)

*E*-plane (*x*-*y* plane)

HORN ANTENNA AND LENS FOR HORN ANTENNA

TECHNICAL FIELD

The invention relates to a horn antenna and a lens for a horn antenna.

BACKGROUND

Wideband high-gain antennas have attracted significant attention due to rapid advancement of wireless communication technologies. To date, various approaches have been devised to create wideband high-gain antennas. However, these existing approaches often result in one or more of: bulky antenna structure, complicated antenna design/construction, limited gain bandwidth, high manufacture cost, etc., which may be undesirable.

SUMMARY OF THE INVENTION

In a first aspect, there is provided a lens for a horn antenna. The lens comprises a generally flared plate assembly extending generally along an axis from a first side to a second side opposite the first side. The generally flared plate assembly defines a plurality of non-linear channels that are operable to manipulate an electromagnetic wave received at the first side to provide a manipulated electromagnetic wave at the second side.

Optionally, the plurality of non-linear channels are arranged such that the manipulated electromagnetic wave at the second side comprises a generally planar wavefront. For example, the plurality of non-linear channels are arranged such that: when the electromagnetic wave received at the first side comprises a generally planar wavefront, the manipulated electromagnetic wave at the second side comprises a generally planar wavefront. In such example, the electric field (E-field) of the electromagnetic wave received at the first side may be generally perpendicular to the axis. In such example, the electromagnetic wave received at the first side may be a y-polarized electromagnetic wave.

Optionally, the plurality of non-linear channels are disposed generally symmetrically about the axis, with the axis acting as the line of reflection symmetry.

Optionally, each non-linear channel of the plurality of non-linear channels respectively includes a first opening at the first side and a second opening at the second side, and a width of the first opening defined perpendicular to the axis is smaller than a width of the second opening defined perpendicular to the axis. The first openings of different non-linear channels may have the same width or different widths. The second openings of different non-linear channels may have the same width or different widths. In one example, each of the first opening operates as an electromagnetic wave inlet and each of the second opening operates as an electromagnetic wave outlet. In another example, each of the first opening operates as an electromagnetic wave outlet and each of the second opening operates as an electromagnetic wave inlet.

Optionally, the plurality of non-linear channels comprises or consists of a first plurality of non-linear channels arranged on one side of the axis and a second plurality of non-linear channels arranged on another side of the axis. The first plurality of non-linear channels and the second plurality of non-linear channels may have the same number of channels. In one example, the first plurality of non-linear channels and the second plurality of non-linear channels are generally symmetrically disposed about the axis, and, as such, the axis acts as the line of reflection symmetry, i.e., the first plurality of non-linear channels and the second plurality of non-linear channels are mirror images of each other about the axis.

Optionally, for each non-linear channel of the first plurality of non-linear channels, a center of the first opening and a center of the second opening can be connected by a straight line that extends at a non-zero angle (e.g., acute angle) to the axis, and the straight lines of the first plurality of non-linear channels are arranged at different angles with respect to the axis in such a way that straight line associated with non-linear channel closer to the axis is at a smaller angle (e.g., acute angle) to the axis than straight line associated with non-linear channel further away from the axis.

Optionally, for each non-linear channel of the second plurality of non-linear channels, a center of the first opening and a center of the second opening can be connected by a straight line that extends at a non-zero angle (e.g., acute angle) to the axis, and the straight lines of the second plurality of non-linear channels are arranged at different angles with respect to the axis in such a way that straight line associated with non-linear channel closer to the axis is at a smaller angle (e.g., acute angle) to the axis than straight line associated with non-linear channel further away from the axis.

Optionally, the generally flared plate assembly comprise a plurality of plates that define the plurality of non-linear channels, and the plurality of plates comprises: a first plate extending at a non-zero angle (e.g., acute angle) to the axis, a second plate extending a non-zero angle (e.g., acute angle) to the axis, and a plurality of intermediate plates arranged between the first plate and the second plate. Optionally, the first plate and the second plate together define a first width perpendicular to the axis on the first side and a second width perpendicular to the axis on the second side, with the first width smaller than the second width. Each non-linear channel may be defined between respective adjacent plates. The first plate may be an end plate. The second plate may be an end plate.

Optionally, the plurality of plates of the generally flared plate assembly are generally symmetric about the axis, with the axis acting as the line of reflection symmetry.

Optionally, each intermediate plate of the plurality of intermediate plates respectively includes: a first end arranged at the first side, a second end at the second side, a first surface extending between the first and second ends, and a second surface opposite the first surface and extending between the first and second ends.

Optionally, the first surface of one or more or each of the plurality of intermediate plates comprises or consists of a wavy or zig-zag surface.

Optionally, the second surface of one or more or each of the plurality of intermediate plates comprises or consists of a wavy or zig-zag surface.

Optionally, for at least some of the plurality of intermediate plates, the wavy surfaces of the same intermediate plate have generally the same wavy shape.

Optionally, for at least some of the plurality of intermediate plates, the wavy surfaces of different intermediate plates have different wavy shapes.

Optionally, the wavy surfaces are defined by a cosine-based function $f_n(x)=\alpha_n \cos(\omega_n x)$, where n is an identifier of the intermediate plate, $\alpha_n$ is amplitude, $\omega_n$ is angular frequency. Different wavy surfaces and/or wavy shapes may have different amplitudes and/or angular frequencies.

Optionally, the first plate includes: a first end arranged at the first side, a second end at the second side, a first surface extending between the first and second ends, and a second surface opposite the first surface and extending between the first and second ends. Optionally, the first surface of the first plate is a generally planar surface. Optionally, the second surface of the first plate is generally planar surface.

Optionally, the second plate includes: a first end arranged at the first side, a second end at the second side, a first surface extending between the first and second ends, and a second surface opposite the first surface and extending between the first and second ends. Optionally, the first surface of the second plate is a generally planar surface. Optionally, the second surface of the second plate is a generally planar surface.

Optionally, the first ends of the plurality of intermediate plates (and optionally the first end of the first plate and/or the first end of the second plate) are arranged on substantially the same plane that is arranged generally perpendicular to the axis.

Optionally, the second ends of the plurality of intermediate plates (and optionally the second end of the first plate and/or the second end of the second plate) are arranged on substantially the same plane that is arranged generally perpendicular to the axis.

Optionally, for each respective intermediate plate of the plurality of intermediate plates, the first end and the second end are generally parallel.

Optionally, the first ends of the plurality of intermediate plates (and optionally the first end of the first plate and/or the first end of the second plate) extend generally perpendicular to the axis.

Optionally, the second ends of the plurality of intermediate plates (and optionally the second end of the first plate and the second end of the second plate) extend generally perpendicular to the axis.

Optionally, the first ends of the plurality of intermediate plates are arranged on substantially the same first plane that is arranged generally perpendicular to the axis, the second ends of the plurality of intermediate plates are arranged on substantially the same second plane that is arranged generally perpendicular to the axis, and the first and second planes are generally parallel.

Optionally, each intermediate plate of the plurality of intermediate plates respectively further includes: a third end extending between the first and second ends of the respective intermediate plate, and a fourth end opposite the third end and extending between the first and second ends of the respective intermediate plate.

Optionally, the first plate further includes: a third end extending between the first and second ends of the first plate, and a fourth end opposite the third end and extending between the first and second ends of the first plate.

Optionally, the second plate further includes: a third end extending between the first and second ends of the second plate, and a fourth end opposite the third end and extending between the first and second ends of the second plate.

Optionally, for each respective intermediate plate of the plurality of intermediate plates, the third end and the fourth end are generally parallel.

Optionally, the third ends of the plurality of intermediate plates (and optionally the third end of the first plate and/or the third end of the second plate) are arranged on substantially the same plane generally parallel to the axis.

Optionally, the fourth ends of the plurality of intermediate plates (and optionally the fourth end of the first plate and/or the fourth end of the second plate) are arranged on substantially the same plane generally parallel to the axis.

Optionally, the third ends of the plurality of intermediate plates are arranged on substantially the same first plane that is perpendicular to the axis, the fourth ends of the plurality of intermediate plates are arranged on substantially the same second plane that is perpendicular to the axis, and the first and second planes are generally parallel.

Optionally, for each intermediate plate of the plurality of intermediate plates (and optionally the first plate and/or the second plate), a distance between the third and four ends defines a height of the intermediate plate. The height of one or more of all of the intermediate plates may be generally constant. The height of the first plate and/or the height of the second plate may be generally constant. The heights of intermediate plates (and optionally the height of the first plate and/or the height of the second plate) may be generally the same.

Optionally, the first surface of each intermediate plate of the plurality of intermediate plates (and optionally the first surface of the first plate and the first surface of the second plate) is a metallic surface. Optionally, the second surface of each intermediate plate of the plurality of intermediate plates (and optionally the second surface of the first plate and the second surface of the second plate) is a metallic surface.

Optionally, the plurality of plates are made entirely of metal. Optionally, the plurality of plates are additively manufactured.

Optionally, the plurality of intermediate plates (and optionally the first plate and/or the second plate) are made entirely of metal. Optionally, the plurality of intermediate plates (and optionally the first plate and/or the second plate) are additively manufactured.

Optionally, the lens further includes a support for supporting the generally flared plate assembly, e.g., plurality of intermediate plates (and optionally the first plate and/or the second plate), in place. The support may include mount(s), coupler(s), bracket(s), frame(s), fastener(s), housing(s), adhesive(s), etc. The support may or may not be symmetric about the axis.

Optionally, the generally flared plate assembly defines an envelope shaped generally as a trapezoidal prism with a short base at the first side and a long base at the second side.

In one example, the lens is suitable for use with a horn antenna only. In one example, the lens is suitable for use with, among other things, a horn antenna.

In a second aspect, there is provided a horn antenna. The horn antenna includes a lens of the first aspect and a power divider assembly operably connected with the lens. The power divider assembly may be directly connected with the lens, without intermediate parts between the power divider assembly and the lens. The horn antenna may be used for receiving and/or transmitting electromagnetic waves. The horn antenna may be a wideband high-gain antenna. In one embodiment, the power divider assembly may be operable to divide power evenly or equally. In another embodiment, the power divider assembly may be operable to divide power unevenly or unequally.

Optionally, the power divider assembly is an equal-ratio power divider assembly arranged to divide power of electromagnetic wave generally equally.

Optionally, the power divider assembly is a different-ratio power divider assembly arranged to divide power of electromagnetic wave unequally.

Optionally, the horn antenna further comprises a flange for connecting with a waveguide. The flange is operably connected with the power divider assembly opposite to the lens.

Optionally, the horn antenna further comprises the waveguide connected with the flange.

Optionally, the power divider assembly comprises one or more power dividers arranged to manipulate an electromagnetic wave from a source to provide a manipulated electromagnetic wave to the lens. The power divider assembly is arranged to manipulate, at least, magnitude of the electromagnetic wave.

Optionally, the power divider assembly is made entirely of metal.

Optionally, the power divider assembly is additively manufactured.

Optionally, the power divider assembly and the lens extend generally along the axis of the generally flared plate assembly. The lens may define a first height perpendicular to the axis and the power divider assembly may define a second height perpendicular to the axis. The first height and the second height may be different or may be substantially the same. The power divider assembly and the lens may be arranged such that the axis bisects the first height and/or the second height.

Optionally, the power divider assembly and the lens extend generally along the axis of the generally flared plate assembly. The lens may define a first height perpendicular to the axis. The power divider assembly may include: a first portion with a second height smaller than the first height and perpendicular to the axis, and a second portion transitioning from the first portion to the lens. The power divider assembly and the lens may be arranged such that the axis bisects the first height and/or the second height. The transition of the second portion may be curved or linear. The second portion may be a generally flared portion flaring along the axis and generally perpendicular to the flaring of the generally flared plate assembly along the axis.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree or relative terminologies such that “generally”, “about”, “approximately”, “substantially”, etc., in connection with a quantity or condition, are, depending on context, used to take into account at least one of: manufacture tolerance, degradation, assembly, use, trend, tendency, practical applications, etc. In some examples, the relative terminology may refer to plus or minus a percentage (e.g., 1%, 5%, 10%, 15%, or 20%) of an indicated value.

As used herein, the expression “generally flared” means a tendency to widen, which includes strictly widening, monotonically widening, or overall widening with instance(s) of narrowing. As used herein, the expressions “generally parallel” and “generally perpendicular” are intended to mean that strictly parallel and strictly perpendicular are not essential. As used herein, the expression “generally symmetrical” is intended to mean that strict symmetry is not essential.

As used herein, the feature “plate” refers broadly to plate-like structure, and is not intended to limit the structure to specific thickness or flatness.

Unless otherwise specified, the terms “connected”, “coupled”, “mounted”, or the like, are intended encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

The invention generally relates to a lens for a horn antenna and a horn antenna including the lens. The lens includes a generally flared plate assembly extending generally along an axis between two sides. The generally flared plate assembly defines non-linear channels operable to manipulate an electromagnetic wave received at one side of the generally flared plate assembly to provide a manipulated electromagnetic wave at the other side of the generally flared plate assembly. In some embodiments, the lens may be an H-plane metal-plate lens including a stack of metal plates or metal-coated plates oriented generally parallel to the H-plane (perpendicular to the E-plane) of the electromagnetic wave. Example embodiments of the invention are provided below.

Figure 1A:
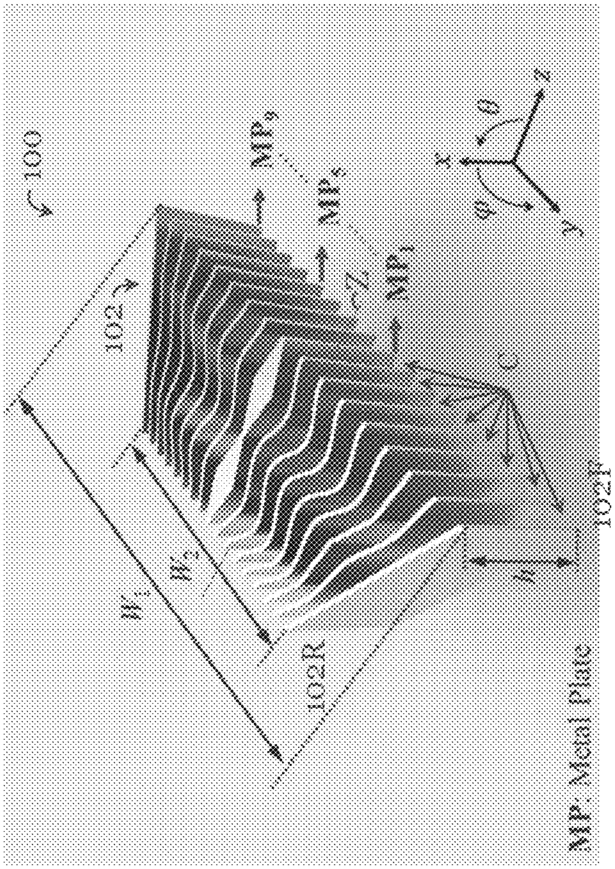
FIG. 1A is a perspective view of a lens for a horn antenna in one embodiment.

FIG. 1A shows a lens 100 for a horn antenna in one embodiment. Generally, the lens 100 includes a generally flared plate assembly 102 extending generally along axis Z between opposite sides 102F, 102R. The generally flared plate assembly 102 defines multiple non-linear channels C that are operable to manipulate an electromagnetic wave received one of the two sides 102F, 102R to provide a manipulated electromagnetic wave at the other one of the two sides 102F, 102R.

Figure 1B:
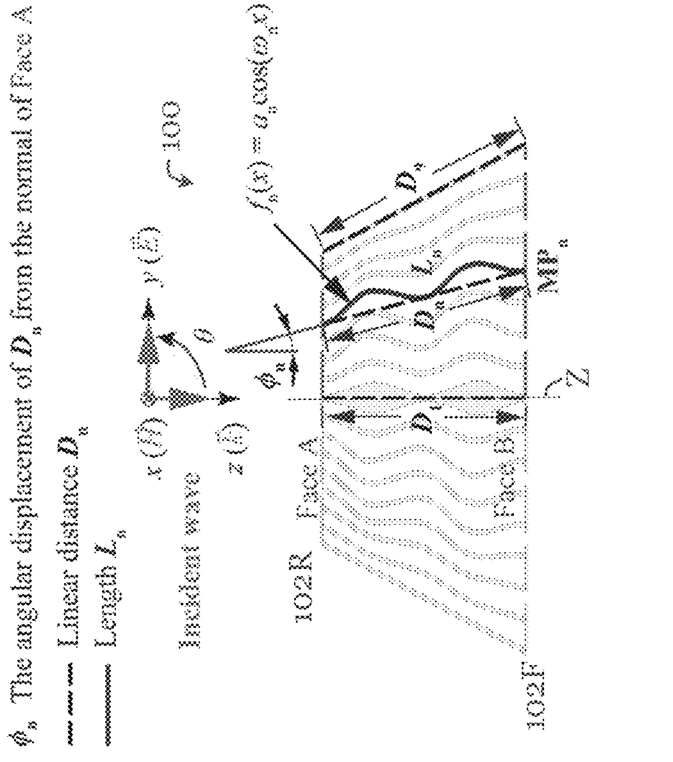
FIG. 1B is a schematic illustration of the lens in FIG. 1A.

The generally flared plate assembly 102 includes multiple plates (i.e., plate-like structures) defining the channels C. In this embodiment, the generally flared plate assembly 102 defines 16 channels C disposed generally symmetrically about axis Z, with 8 channels C on one side of axis Z and 8 channels C on another side of axis Z. Each of the 16 channels C respectively includes an opening at one side 102R and another opening at the other side 102F. In this embodiment, for each respective channel C, the width (defined along y-axis in the frame of reference of FIG. 1A) of the opening at the side 102F is larger than the width (defined along y-axis in the frame of reference of FIG. 1A) of the opening at the side 102R. Also, in this embodiment, the width of different openings for different channels C at the side 102F is generally the same, and the width of different openings for different channels C at the side 102R is generally the same. Referring to FIGS. 1A and 1B, in this embodiment, for each of the channels C, a center of the opening at the side 102R and a center of the opening at the side 102F can be connected by a straight line that extends at a non-zero, acute angle to the axis Z. For the 8 channels C arranged on one side of axis Z, the straight lines of the channels C are arranged at different angles with respect to the axis Z in such a way that straight line associated with the channel C closer to the axis Z is at a smaller angle to the axis Z than straight line associated with the channel C further away from the axis Z. The same applies to the 8 channels C arranged on another side of axis Z, due to the symmetric property of the channels C.

As mentioned, the channels C are defined by the plates of the generally flared plate assembly 102. In this embodiment, the generally flared plate assembly 102 includes 17 plates (only 9 of which are labelled in FIG. 1A as $MP_1$-$MP_9$). These 17 plates define the 16 channels C, with one channel C between every two adjacent plates. As illustrated in FIG. 1A, the plates includes 2 lateral end plates (one is $M_9$) respectively extending at a non-zero angle to the axis Z and 15 intermediate plates arranged between the lateral end plates. The 15 intermediate plates include a central intermediate plate $M_1$, 7 intermediate plates between one lateral end plate and the central intermediate plate $M_1$, and 7 intermediate plates between the other lateral end plate and the central intermediate plate $M_1$. The 2 lateral end plates together define a smaller width $w_2$ at the side 102R and a larger width $w_1$ at the side 102F. In this embodiment, the plates of the generally flared plate assembly 102 are generally symmetric about the axis Z. Although not illustrated, the plates may be secured in place by a support arrangement, which may include mechanical means (e.g., mount(s), coupler(s), bracket(s), frame(s), fastener(s), housing(s), adhesive(s), etc.).

As shown in FIG. 1A, in this embodiment, each of the plates of the generally flared plate assembly 102 includes one end at the side 102R, another end at the side 102F, top and bottom ends (defined along the axis x in the frame of reference of FIG. 1A), and two, opposite surfaces each extending between the two ends (at the two sides 102R, 102F) and between the top and bottom ends.

In this embodiment, the two surfaces of each of the 15 intermediate plates are wavy (wrinkled) surfaces. Specifically, for each of the 7 intermediate plates between one lateral end plate and the central intermediate plate $M_1$ and each of the 7 intermediate plates between the other lateral end plate and the central intermediate plate $M_1$, the two surfaces of the same intermediate plate are wavy surfaces of generally the same wavy shape. For the central intermediate plate $M_1$, the two surfaces are wavy surfaces of different (opposite) wavy shapes. In this embodiment the wavy surfaces or wavy shapes are defined by a cosine-based function $f(x)=a_n \cos(\omega_n x)$, where n is an identifier of the intermediate plate, an is amplitude, $\omega_n$ is angular frequency. The amplitude and/or the angular frequency for each respective intermediate plate may be constant or may be variable. In this embodiment, the wavy surfaces central intermediate plate $M_1$ are the waviest (e.g., largest amplitude of cosine function), and the waviness of the wavy surfaces of the intermediate plates on two sides of the central intermediate plate $M_1$ decreases away from the central intermediate plate $M_1$. In other words, the wavy surfaces of the intermediate plate $M_2$ is wavier (e.g., larger amplitude of cosine function) than the wavy surfaces of the intermediate plate $M_3$, the wavy surfaces of the intermediate plate $M_3$ is wavier (e.g., larger amplitude of cosine function) than the wavy surfaces of the intermediate plate $M_4$, and so on. The same applies for the plates on the other side of the axis Z, as the plates are generally symmetric about axis Z in this embodiment. As shown in FIG. 1A, in this embodiment, the two surfaces of each of the 2 lateral end plates are generally planar surfaces. In this embodiment, the plates of the generally flared plate assembly 102 are referred to as metallic plates or metal plates, and the lens 100 is referred to as metallic lens or metal lens. They can be made entirely by metal, e.g., using additive manufacturing (3D printing) methods, or they can be made partly by metal, with at least the two surfaces (between top and bottom ends and between the ends at sides 102R and 102F) of each of the plates being metallic surfaces.

As shown in FIGS. 1A and 1B, in this embodiment, the ends (e.g., end surfaces) of the plates of the generally flared plate assembly 102 at the side 102R are arranged on substantially the same plane (x-y plane in the frame of reference of FIG. 1A, face A in FIG. 1B) that is generally perpendicular to the axis Z, and the ends (e.g., end surfaces) of the plates of the generally flared plate assembly 102 at the side 102F are also arranged on substantially the same plane (another x-y plane in the frame of reference of FIG. 1A, face B in FIG. 1B) that is generally perpendicular to the axis Z. The ends of each respective one of the plates are generally parallel. Also, as shown in FIGS. 1A and 1B, in this embodiment, the top ends (e.g., end surfaces) of the plates of the generally flared plate assembly 102 are arranged on substantially the same plane (y-z plane in the frame of reference of FIG. 1A) parallel to the axis Z, and the bottom ends (e.g., end surfaces) of the plates of the generally flared plate assembly 102 are arranged on substantially the same plane (another y-z plane in the frame of reference of FIG. 1A) parallel to the axis Z. In this embodiment, each of the plates have a substantially constant height h (defined along the x-z axis in the frame of reference of Figured 1A), and the plates have substantially the same height h. As illustrated in FIG. 1A, in this embodiment, the side 102R of the lens 100 is an inlet for electromagnetic waves and the side 102F of the lens 100 is an outlet for electromagnetic waves, and the input (inlet) aperture size of the lens 100 is $w_2 \times h$ and the output (outlet) aperture size of the lens 100 is $w_1 \times h$, where $w_1$ is larger than $w_2$.

As illustrated in FIG. 1A, in this embodiment, the generally flared plate assembly 102 defines an envelope shaped generally as a trapezoidal prism with a short base at the side 102R and a long base at the side 102F, and trapezoidal bases at the top and bottom.

Referring now to FIG. 1B, a straight line that connects two ends of the same plate form an angle $\phi_n$ with axis Z. In this embodiment, $\phi_n$ is defined by $\phi_2=\cos^{-1}(D_1/D_n)$, where $D_1$ is the linear (direct) distance, i.e., displacement, between two ends of the central intermediate plate and $D_n$ is the linear (direct) distance, i.e., displacement, between two ends of the $n^{th}$ plate.

Without loss of generality, the following description provides a more detailed explanation of the design of the lens 100 with reference to plate $MP_n$. As mentioned, the channels and plates are arranged generally symmetric about axis Z so only channels C and plates $M_1$-$M_9$ on one side (but including the central plate $M_1$) are labelled.

With reference to FIG. 1B, a y-polarized incident electromagnetic (EM) wave enters the lens at face A (enters at face A at side 102R, travels through the lens 100, and exits the lens at face B at side 102F). Note that in FIG. 1B, the dotted lines illustrating the faces A and B are shown to have blocked some of the openings of the channels of the lens 100. In this embodiment, the shapes of $MP_n$ are based on a cosine function $$f_n(x) = a_n \cos\left(\frac{4\pi x}{D_n}\right),$$

where $\alpha_n$ and $D_n$ are the amplitude and direct distance between the two endpoints of $MP_n$, respectively. The length $L_n$ of $MP_n$ is given by $$L_n=\int_0^{d_n}\sqrt{1+(f'_n(x))^2}dx \quad (1)$$

In theory, the same phase of electromagnetic wave can be obtained at face B for the different channels when $L_1=L_2=L_3= \ldots =L_9$ (where $L_n$ is the length of the $n^{th}$ plate) and the various amplitudes $\alpha_n$ can be determined by fixing one of the $L_n$, e.g., $L_9$. However, in practice, due to for example the fringing-field effect at the aperture at face B, it is found that $L_n$ needs to be modified to $L_n'$ to improve the phase uniformity of the electromagnetic wave at face B. In this embodiment, correction factors $c_n$, defined as $c_n=L_n'/L_9$, with their values optimized using HFSS, are used. Table I shows the values of the correction factors $c_n$ for different $MP_n$. Based on the values, the actual lengths $L_n'=c_nL_9$ can be determined for the fabrication. In other words, in this embodiment, the physical lengths of different plates $MP_n$ on the same side are different and the phase distribution at the aperture at face B is the substantially same after the correction factors $c_n$ are applied.

TABLE I

| Correction coefficients for different channels | | | | | | | | | |
|---|---|---|---|---|---|---|---|---|---|
| $MP_n$ | 1 | 2 | 3 | 4 | 5 | 6 | 7 | 8 | 9 |
| $c_n$ | 1.05 | 1.1 | 1.25 | 1.35 | 1.35 | 1.25 | 1.1 | 1.0 | 1 |

Figure 2A:
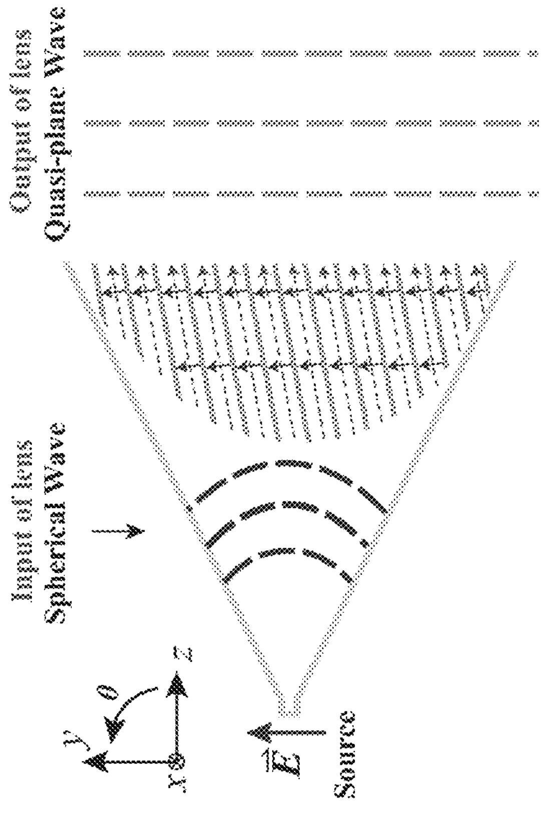
(prior art) Figure 2A
FIG. 2A is a schematic illustration of an operation of a horn antenna with a conventional lens.
Figure 2B:
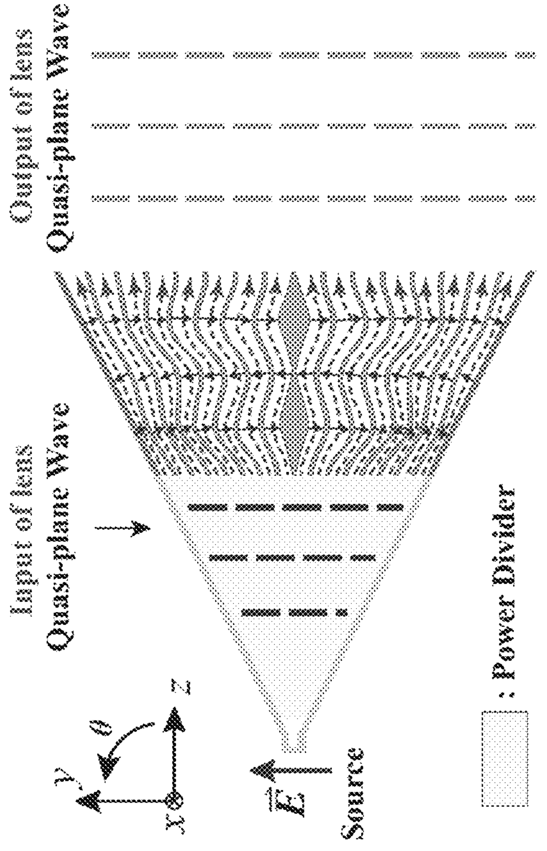
FIG. 2B is a schematic illustration of an operation of a horn antenna with the lens of FIG. 1A.

The operation principle of the lens 100 is now described. FIG. 2A shows the operation principle of a horn antenna with a conventional lens (operable as H-plane metal lenses) for a horn antenna whereas FIG. 2B shows the operation principle of a horn antenna with the lens 100 (operable as H-plane metal lenses). Both antenna receive electromagnetic waves from a point source E.

As shown in FIG. 2A, in the horn antenna with conventional lens, the electromagnetic wave is confined by linear metal plates of different lengths, with the phase delay of the incoming electromagnetic wave manipulated or controlled by the lengths of the channels. Thus, in this design, the lengths of the channels control the phase distribution at the output aperture. However, as the phase velocities in the channels are dispersive, the lens suffers from a limited bandwidth. Also, the radiation pattern may be undesirable due to the asymmetric structure of the channels.

As shown in FIG. 2B, the horn antenna includes the lens 100 and a power divider assembly disposed between the source E and the lens 100. The power divider is operable to manipulate the electromagnetic wave from the source E to produce a generally planar wavefront to be input to the lens 100. Details of the power divider assembly will be described below. The lens 100 guides the electromagnetic waves to flow sinuously from the input aperture through the lens to the output aperture. The operating principle of the lens 100 is based on electromagnetic wave retardation, similar to that of a dielectric lens (hence the lens 100 may be considered as a delay lens). For lens 100, a plane electromagnetic wave is received at the input side with a smaller aperture, and manipulated by the lens 100 (channels and plates), then a plane electromagnetic wave is outputted at the output side with a larger aperture. This transformation is realized by the non-linear channels in the lens 100. With different amplitudes an of the sinusoidal functions $f_n(x)$, the overall physical lengths of the channels can be arranged to provide a wideband substantially-constant phase over the output aperture.

The lens 100 design is advantageous over the convention design. First, the lens 100 is less sensitive to frequency change hence a wider-band lens can be obtained. Second, a more symmetrical radiation pattern can be produced. Third, the antenna design with the lens 100 is more compact as the lens 100 is integrated with the horn (i.e., not external to the horn).

FIGS. 3A to 3D illustrate a horn antenna 300 in one embodiment. In this embodiment, the horn antenna 300 is a high-gain antenna with a generally uniform magnitude distribution at its outlet aperture. The horn antenna 300 includes a flange 302 for connection with a waveguide, a power divider assembly 304 connected with the flange 302, and a metal lens 306 (with the same design as the lens 100) connected with the power divider assembly 304. The antenna 300 also includes holding strips 308 for holding or supporting the power divider assembly 304 and the lens 306 in place. As described herein, the antenna 300 is also referred to as "Ant.1".

Figure 3B:
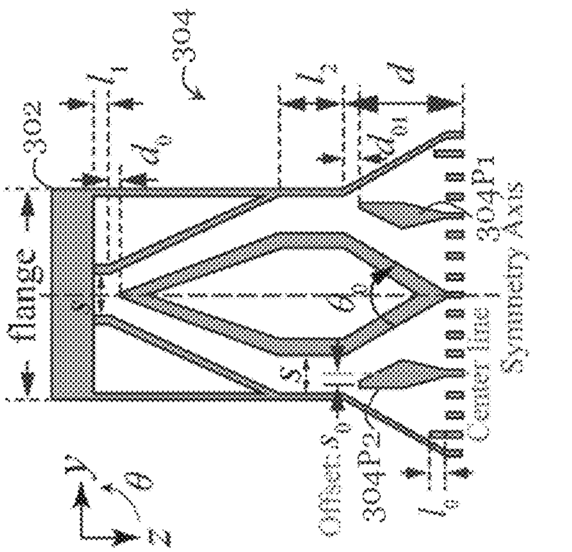
FIG. 3B is an illustration (top view) of the power divider assembly of the horn antenna of FIG. 3A.
Figure 3D:
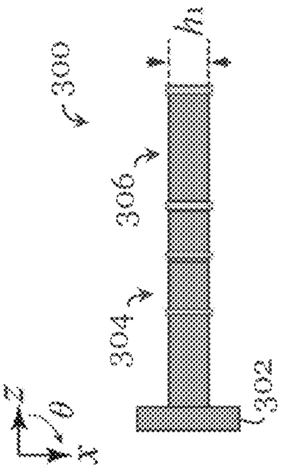
FIG. 3D is an illustration (side view) of the horn antenna of FIG. 3A.
Figure 3A:
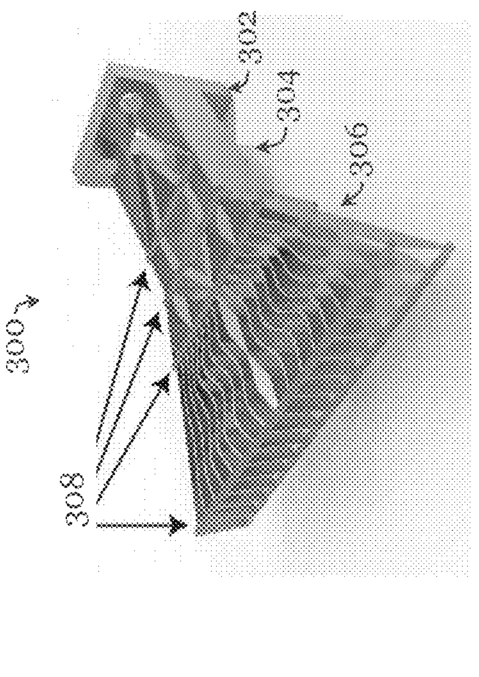
FIG. 3A is a perspective view of a horn antenna in one embodiment, which incorporates the lens of FIG. 1A.

FIG. 3A shows the overall design of the antenna 300. FIG. 3B shows the flange 302 and the power divider assembly 304. In this embodiment, the flange 302 is made of metal and is arranged to be connected with a standard waveguide WG18 (15.799×7.899 $mm^2$). The flange 302 includes an opening to the power divider assembly 304 (as best illustrated in FIG. 3A) so that an electromagnetic wave received from the waveguide can be provided to the power divider assembly 304. In this embodiment, the power divider assembly 304 is also made of metal (e.g. metal plates). The power divider assembly 304 includes a central channel portion, two channel portions branched from the central channel portion and symmetrically disposed about the axis of symmetry (e.g., parallel to or collinear with axis Z), and two power dividers 304P1, 304P2 at the outlet of each of the two branched channel portions. As a result of the power dividers 304P1, 304P2, the two channel portions are further branched into four channel portions connected with the lens. As shown in FIG. 3B, the leading end or edge of each of the power dividers 304P1, 304P2 has a respective offset $s_0$ away from the symmetry axis and relative to a centerline of the corresponding one of the two channel portions, to help obtain a generally uniform magnitude distribution of the electromagnetic wave.

Figure 3C:
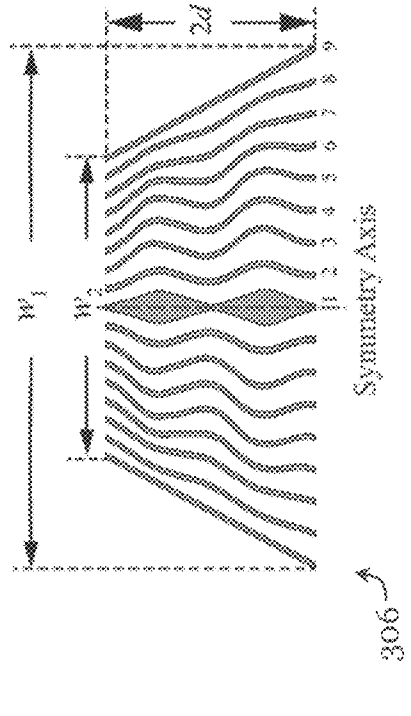
FIG. 3C is an illustration (top view) of the lens of the horn antenna of FIG. 3A.

FIG. 3C shows the lens 306, which is generally the same as lens 100, hence is not described again. FIG. 3D shows the antenna 300 when viewed from one side. It can be seen that the height of the power divider assembly 304 and the lens 306 (specifically the plates of the lens 306) are generally the same.

The values of the parameters of the antenna 300 as optimized with HFSS are shown in Table II. In this example the design parameters of the lens are the same as those in the lens 100, unless otherwise specified. In Table II, thickness refers to the thickness of the plates of the lens 306.

TABLE II

| Parameters of the antenna 300 | | | | | | | |
|---|---|---|---|---|---|---|---|
| flange | $l_0$ | $l_1$ | $l_2$ | $l_3$ | s | $s_0$ | d |
| 40.0 mm | 3.5 mm | 3.0 mm | 12.0 mm | 3.0 mm | 7.9 mm | 2.0 mm | 19.4 mm |
| $d_0$ | $d_{01}$ | $w_0$ | $w_1$ | $w_2$ | $h_1$ | θ | Thickness |
| 2.0 mm | 3.0 mm | 1.0 mm | 106.0 mm | 59.7 mm | 15.8 mm | 60° | 0.6 mm |

Simulations are performed to demonstrate the phase correction ability of the antenna 300 (compared with a conventional horn antenna).

Figure 4A:
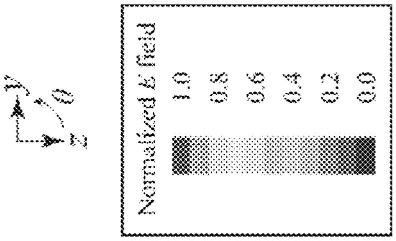
FIG. 4A is a plot showing simulated (normalized) electric field distribution in a conventional horn antenna (reference) at 15 GHz.
Figure 4A:
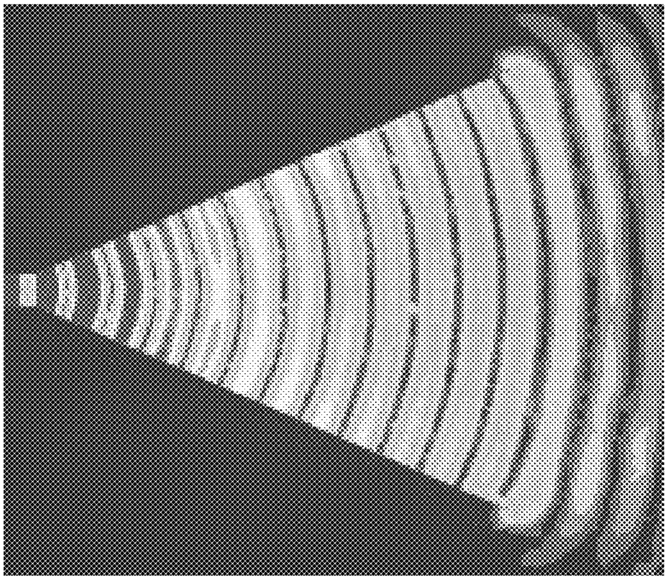
Figure 4B:
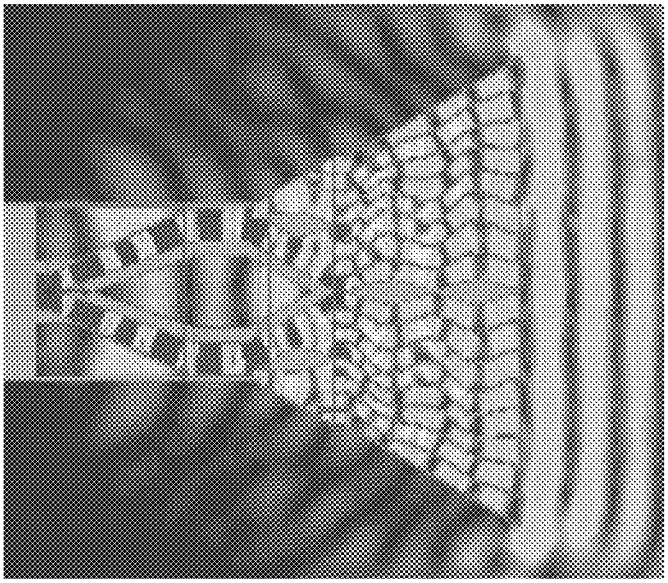
FIG. 4B is a plot showing simulated (normalized) electric field distribution in the horn antenna of FIG. 3A at 15 GHz.

FIG. 4A shows simulated (normalized) electric field distribution in a conventional horn antenna (reference) at 15 GHz whereas FIG. 4B shows simulated (normalized) electric field distribution in the horn antenna 300 of FIG. 3A at 15 GHz. In this simulation, both the conventional horn antenna and the antenna 300 have the same length along the symmetry axis. As shown in FIGS. 4A and 4B, the conventional horn has a curved wavefront at the radiating aperture (outlet) whereas antenna 300 has a relatively straight wavefront at the radiating aperture (outlet) at least due to the presence of the lens 306 (e.g., as an H-plane metal lens).

Figure 5:
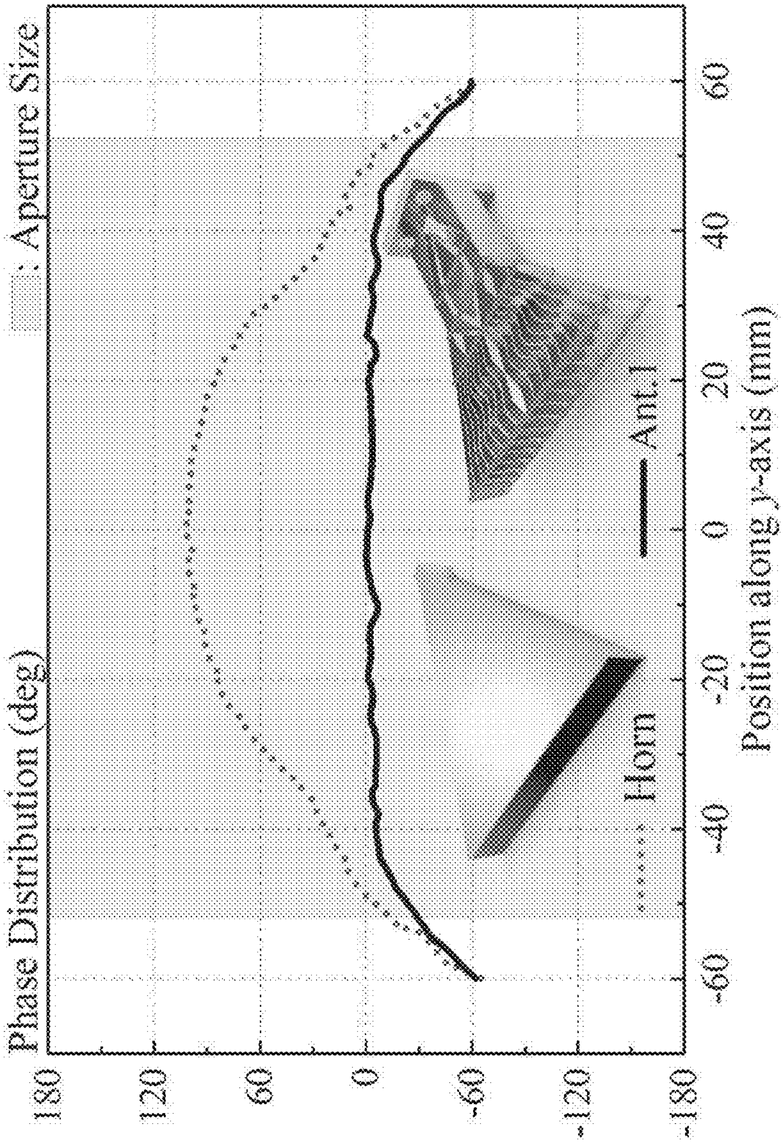
FIG. 5 is a graph showing simulated electric field phase distributions of the conventional horn antenna (reference) and the horn antenna in one embodiment along the aperture at 15 GHz.

FIG. 5 shows the simulated electric field phase distributions of the conventional horn antenna and of the antenna 300 along the radiating aperture (outlet) at 15 GHz. As shown in FIG. 5, the overall phase variation of antenna 300 is much smaller than that of the reference horn antenna.

Figure 6:
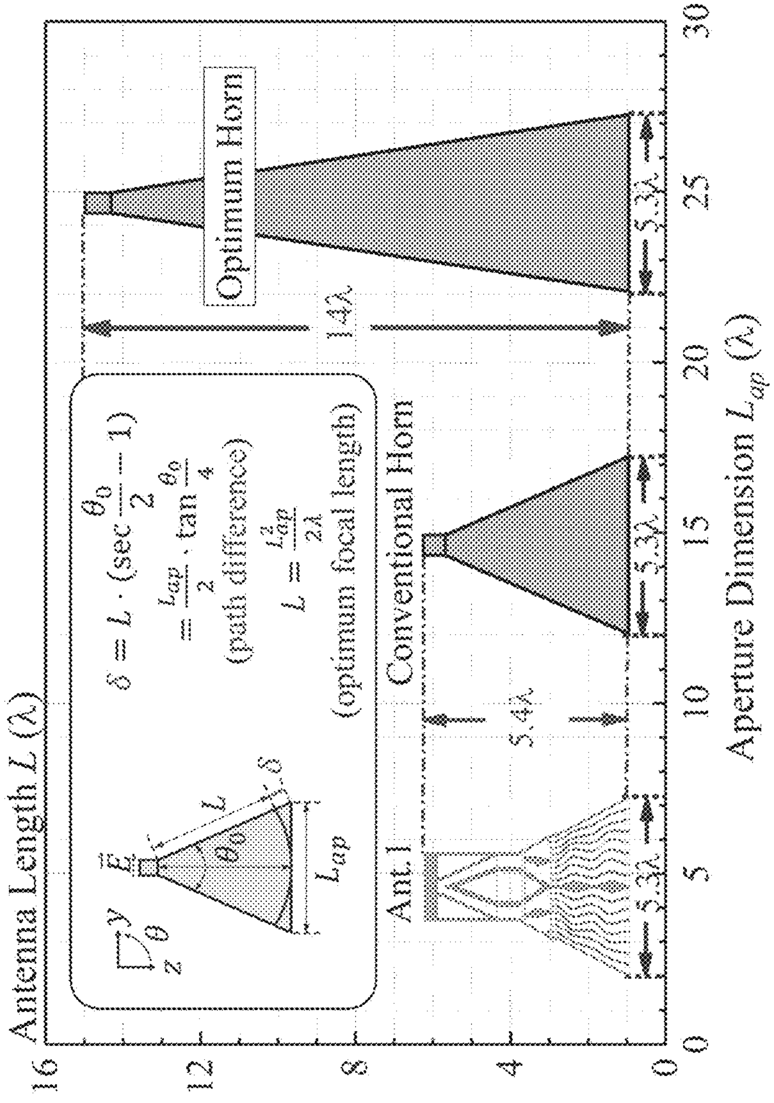
FIG. 6 is a schematic diagram illustrating respective dimensions (axial length and aperture size) of the horn antenna of FIG. 3A, a conventional horn antenna (reference), and an optimized conventional horn antenna (reference—optimum)

In theory, generally, the directivity of an aperture antenna is maximum when the field is uniform across the aperture (outlet). FIG. 6 compares the physical sizes, in particular lengths and aperture (outlet) dimensions, of the antenna 300 ("Ant.1"), a conventional horn antenna ("convention horn", without metal lens inside), and an optimized conventional horn antenna ("optimum horn", without metal lens inside). Based on the illustration in FIG. 6, it can be determined that the curved wavefront of the reference horn antenna in FIG. 4A is caused by the physical path length difference (δ). δ generally increases as the flare angle $\theta_0$ (the included angle defined by the two lateral end plates of the lens) increases. To optimize or maximize the directivity of an E-plane sectoral horn antenna, the dimensions of the optimized conventional horn antenna in FIG. 6 should satisfy the following:

$$L_{ap}=\sqrt{2\lambda L} \quad (2)$$

where $L_{ap}$ and L are the aperture (outlet) length and focal length, respectively, and λ is the wavelength of the electromagnetic wave.

According to equation (2), for the same aperture (outlet) length of $L_{ap}=5.3\lambda$ at 15 GHz, the focal length L of the optimized conventional horn antenna should be equal to 14.0λ. Thus, as compared with the optimized conventional horn antenna, the size of the antenna 300 is reduced by more than 60%, with the flare angle $\theta_0$ almost doubled due to a much shorter antenna length L. This shows that the design of the antenna 300 with the lens 306 can reduce the path difference δ and thus the phase error.

Figure 7:
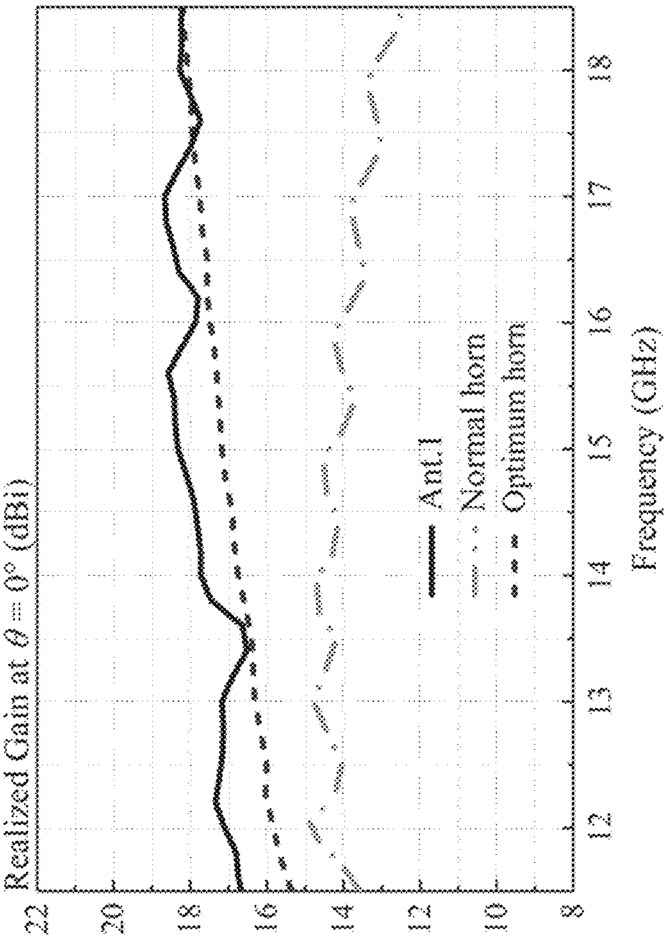
FIG. 7 is a graph showing simulated realized gains (at $\theta=0°$) of the horn antenna of FIG. 3A, the conventional horn antenna (reference), and the optimized conventional horn antenna (reference—optimum) in FIG. 6 at different frequencies (GHz)

FIG. 7 shows simulated realized gains (at θ=0°) of the three antennas illustrated in FIG. 6. With reference to FIG. 7, for the same aperture (outlet) size, the antenna 300 ("Ant.1") has the best performance among the three antennas. The realized antenna gain of the antenna 300 ("Ant.1") is about 4 dB higher than that of the conventional horn antenna and is about 1 dB higher than that of the optimized conventional horn antenna. Therefore, the open horn antenna 300 can reduce the antenna size and increase antenna gain.

Figures 8A, 8B, 8C, 8D:
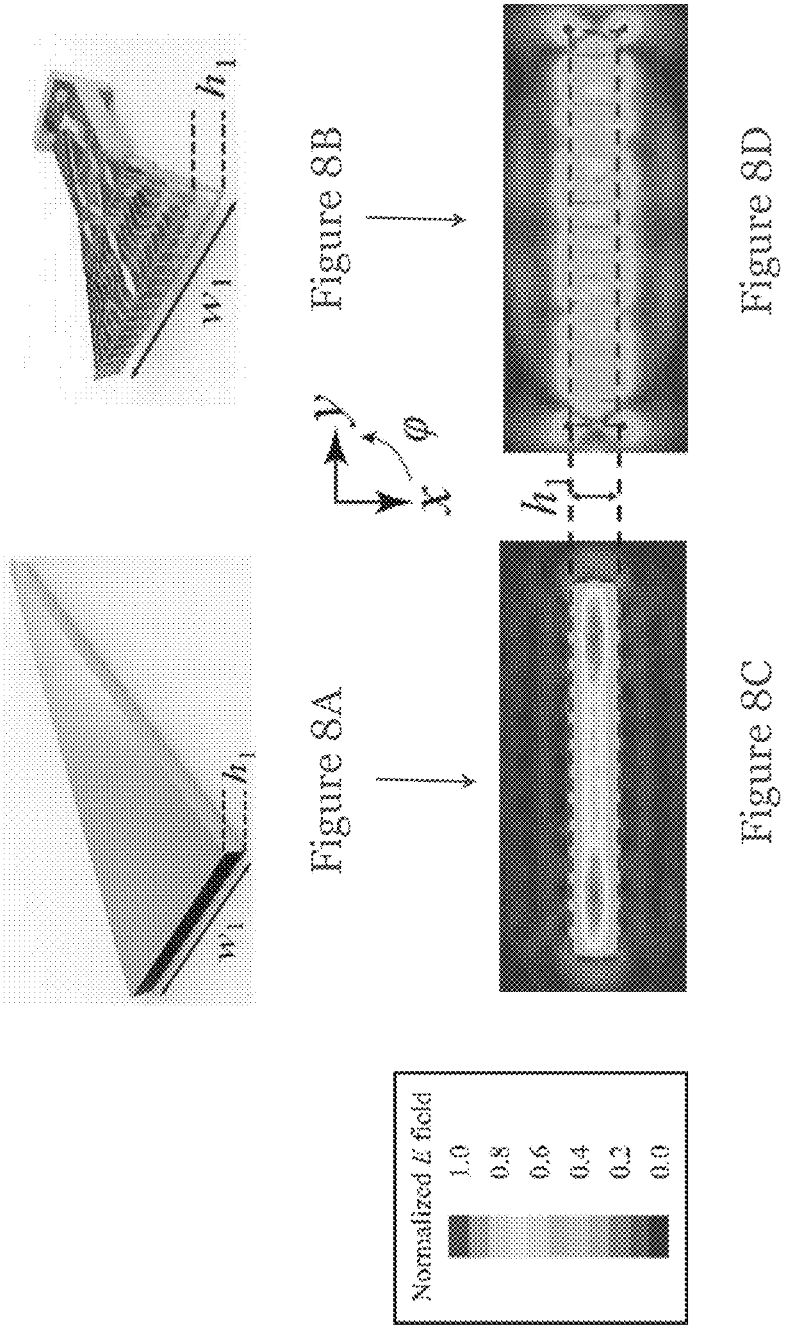
FIG. 8A is an illustration of the optimized conventional horn antenna in FIG. 6.
FIG. 8B is an illustration of the horn antenna of FIG. 3A.
FIG. 8C is a plot showing simulated (normalized) electric field distribution at the aperture of the optimized conventional horn antenna at 15 GHz.
FIG. 8D is a plot showing simulated (normalized) electric field distribution at the aperture of the horn antenna in one embodiment at 15 GHz.

To better illustrate the gain enhancement, FIGS. 8A to 8D show the optimized conventional horn antenna in FIG. 6, the horn antenna 300 in FIG. 6, and their respective simulated (normalized) electric field distribution at the aperture (outlet) at 15 GHz. As shown in FIGS. 8C and 8D, antenna for the same physical aperture (outlet) size, the horn antenna 300 ("Ant.1") has a larger effective radiating area than that of the optimized conventional horn.

Figure 9A:
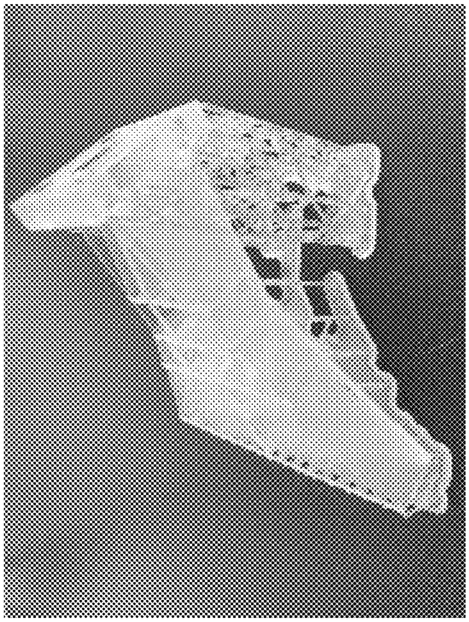
FIG. 9A is a photograph (perspective view) of a prototype of a horn antenna (fabricated based on the horn antenna of FIG. 3A) in one embodiment before electroplating.
Figure 9B:
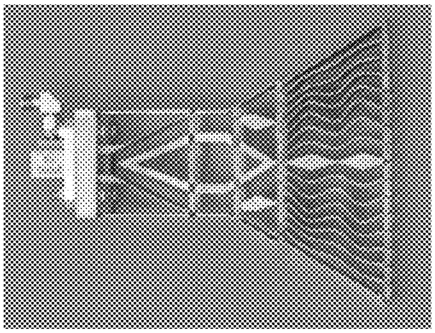
FIG. 9B is a photograph (top view) of the prototype of the horn antenna in FIG. 9A after electroplating.
Figure 9C:
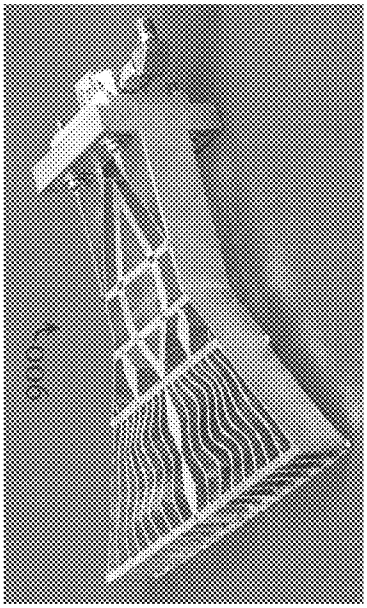
FIG. 9C is a photograph (perspective view) of the prototype of the horn antenna in FIG. 9A after electroplating.

FIGS. 9A to 9C show a prototype antenna 900 (with flange, power divider assembly, and lens) made according to the design of the antenna 300 with lens 100. In this example, the prototype antenna 900 is fabricated by additively manufacturing a skeleton shown in FIG. 9A using high-temperature polylactic acid (PLA) that has a dielectric constant of 2.66. After the skeleton is formed, it is applied with metallic material(s), e.g., electroplated using metallic material(s), such as copper or aluminium, to obtain a metal-coated skeleton that forms the antenna. In this example the skeleton is processed (e.g., cut) to remove unnecessary part(s) before. In this embodiment, after electroplating, four plastic strips (not coated with metal) are used to secure or support the lens and power divider assembly of the antenna 900. Note that FIGS. 9B and 9C show a waveguide connected to the flange of the antenna 900.

Experiments (simulations and measurements) are performed on the fabricated antenna 900 to verify its performance. In the experiments, the reflection coefficient of the prototype antenna 900 is measured with a Keysight E8361A network analyzer, and the realized antenna gain and radiation pattern of the prototype antenna 900 are measured with a Satimo StarLab system.

Figure 10A:
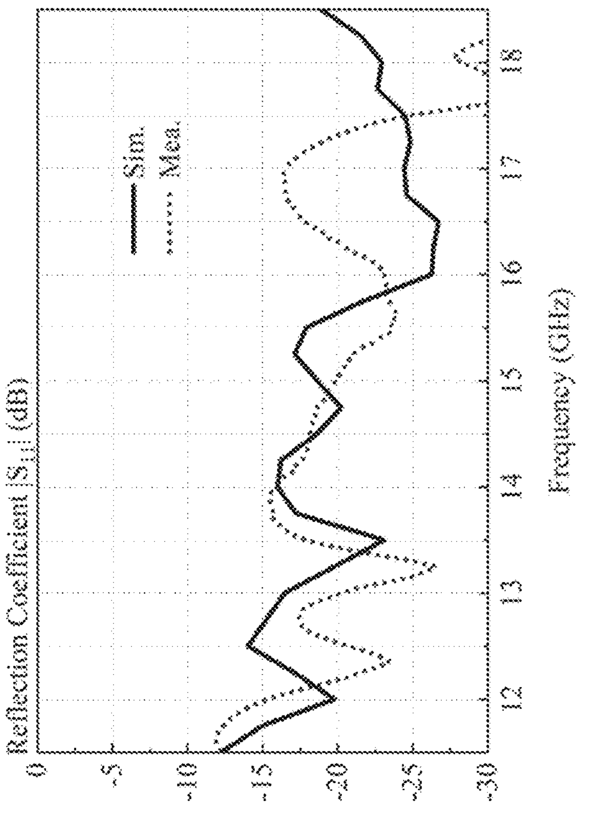
FIG. 10A is a graph showing measured and simulated reflection coefficients ($|S_{11}|$) of the horn antenna of FIG. 9C at different frequencies (GHz)
Figure 10B:
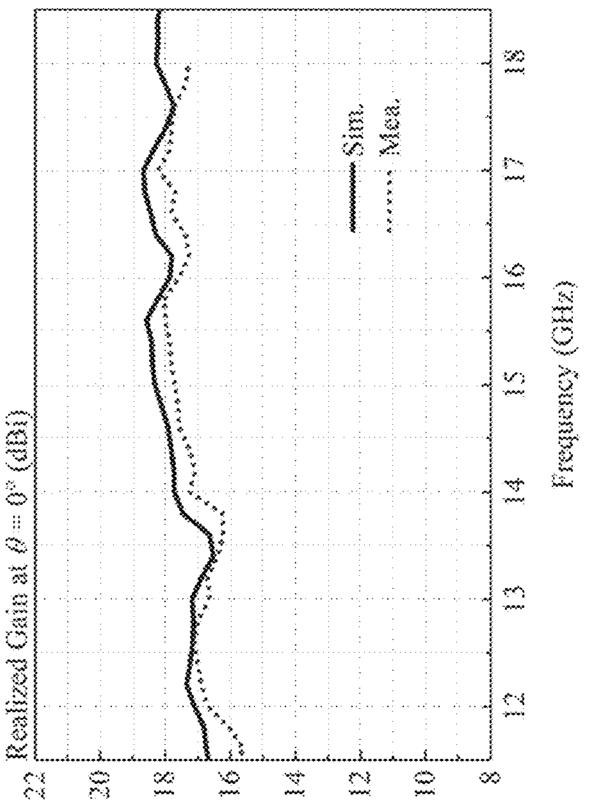
FIG. 10B is a graph showing measured and simulated realized gains (at $\theta=0°$) of the horn antenna of FIG. 9C at different frequencies (GHz)

FIG. 10A shows the measured and simulated reflection coefficients ($|S_{11}|$) of the prototype antenna 900. As shown in FIG. 10A, both the measured and simulated reflection coefficient $|S_{11}|$ have a 10 dB bandwidth of 46% (in the range of 11.5 GHz to 18.5 GHz). FIG. 10B shows the measured and simulated realized gains (at θ=0°) of the prototype antenna 900. The measured 1 dB gain bandwidth is 25% (in the range of 13.9 GHz to 18.0 GHz) and the simulated 1 dB gain bandwidth is 26.3% (in the range of 14.2 GHz to 18.5 GHz), respectively, with the measured gain varying between 15.8 and 18.3 dBi over the frequency range in FIGS. 10A and 10B (in the range of 11.5 GHz to 18.0 GHz). Both FIGS. 10A and 10B show reasonable agreement between the measured and simulated results.

In theory, the aperture efficiency $\varepsilon_{ap}$ can be calculated from the antenna gain G and physical aperture area $A_p$ based on:

$$\varepsilon_{ap}=\frac{\lambda^2 G}{4\pi A_p} \quad (3)$$

where λ is wavelength of the electromagnetic wave. By inserting the measured realized gain into equation (3), the aperture efficiency $\varepsilon_{ap}$ of the prototype antenna 900 is found to be 109.3%.

Figure 11A:
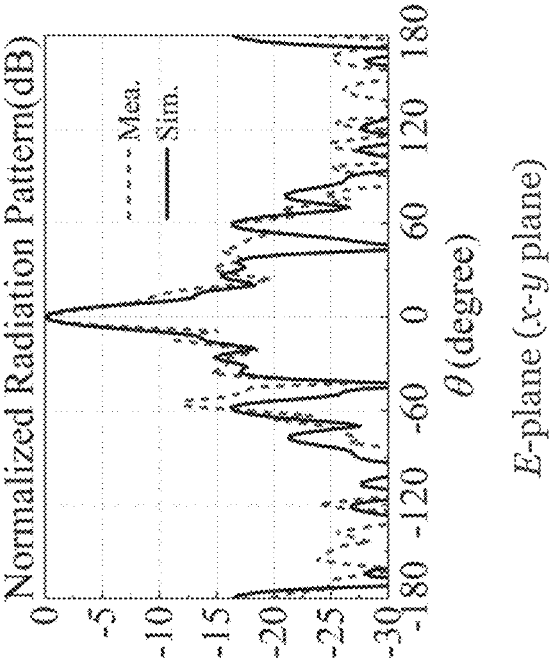
FIG. 11A is a graph showing measured and simulated (normalized) radiation patterns of the horn antenna of FIG. 9C in the E-plane (x-y plane)
Figure 11B:
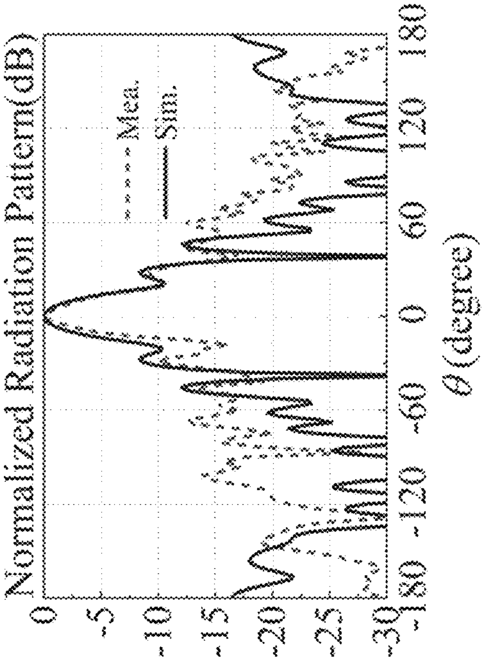
FIG. 11B is a graph showing measured and simulated (normalized) radiation patterns of the horn antenna of FIG. 9C in the H-plane (x-z plane)

FIGS. 11A and 11B show measured and simulated radiation patterns of the prototype antenna 900 in E-plane and H-plane respectively. As shown in FIGS. 1A and 11B, reasonable agreement between the measured and simulated results is obtained. It is believed that the discrepancy between the measured and simulated results is mainly caused by tolerance and errors associated with the fabrication process such as the spillover of metallic coating during the electroplating process, deformation of polylactic acid during the additive manufacturing (3D printing) process, etc. As shown in FIGS. 11A and 11B, a quasi-pencil beam is obtained, which is different from a fan beam of a conventional E-plane horn antenna. Also, it can be seen that the side-lobe level (SLL) remains relatively high in both the E- and H-planes. In this example, the relatively strong side-lobe level In the E-plane is due to the uniform magnitude distribution at the radiating aperture whereas the relatively strong side-lobe level in the H-plane is caused by the open horn structure.

Figure 12:
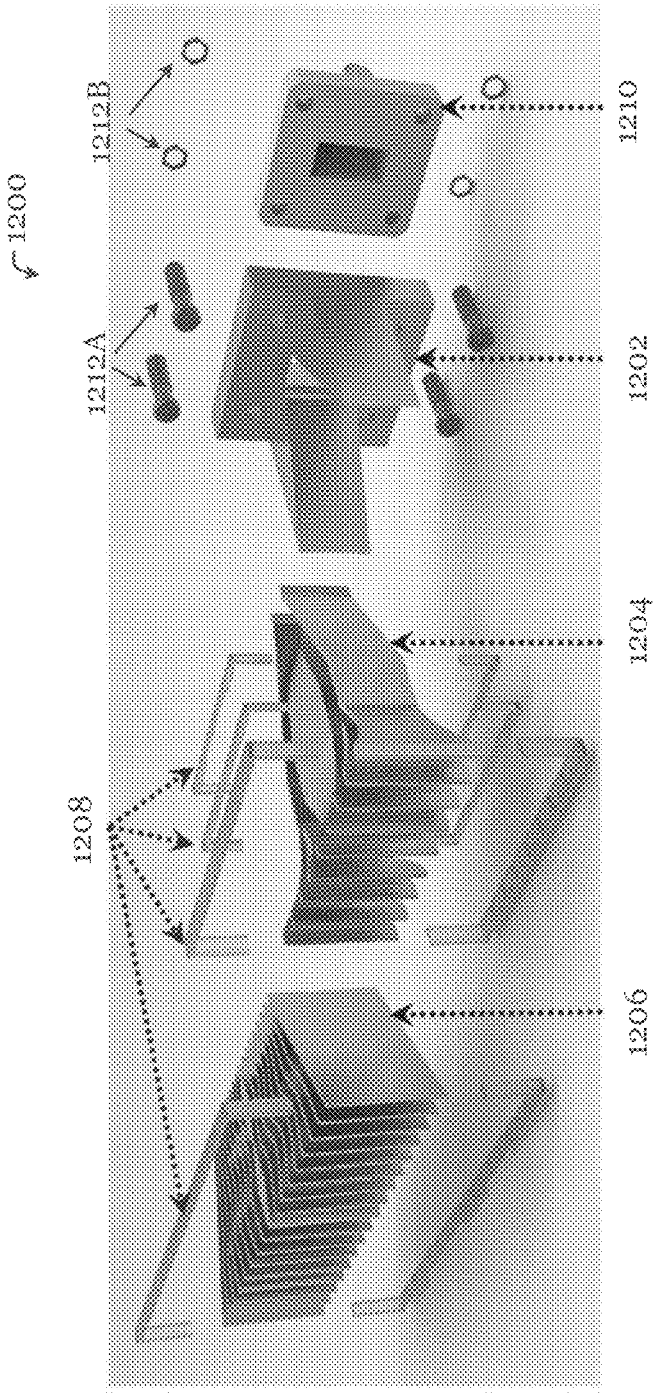
FIG. 12 is a schematic diagram (exploded view) of a horn antenna in one embodiment.

FIG. 12 shows a horn antenna 1200 in one embodiment of the invention. The horn antenna 1200 in this embodiment has a similar design as antenna 300, 900, but it can better suppress the side-lobe level than antenna 300, 900. The horn antenna 1200 is operable to provide a tapered magnitude distribution at its radiating aperture.

As shown in FIG. 12, the horn antenna 1200 includes a flange 1202 connected with a waveguide 1210, a power divider assembly 1204 connected with the flange 1202, and a metal lens 1206 (with the same design as the lens 100) connected with the power divider assembly 1204. In this embodiment, the flange 1202 is connected with the waveguide 1210 using four bolts 1212A and corresponding nuts 1212B. The flange 1202 is designed to stabilize the antenna 1200. The waveguide is a standard waveguide WG18 ($15.799 \times 7.899$ $mm^2$). The antenna 1200 also includes holding strips 1208 for holding or supporting the power divider assembly 1204 and the lens 1206 in place. In this embodiment, the holding strips 1208 are additively manufactured using polylactic acid. As described herein, the antenna 1200 is also referred to as "Ant.2". In this embodiment, the flange 1202, the power divider assembly 1204, and the metal lens 1206 are additively manufactured using aluminum alloy powder. In this embodiment, the power divider assembly 1204 can be referred to as the magnitude part (as it mainly controls or manipulates magnitude of the electromagnetic wave) whereas the lens 1206 can be referred to as the phase part (as it mainly controls or manipulates phase of the electromagnetic wave). With such arrangement, in this embodiment the amplitude and phase distributions of the electromagnetic wave can be generally independently varied by adjusting the design of different parts of the antenna 1200. This helps to facilitate design of the antenna 1200.

Figure 13B:
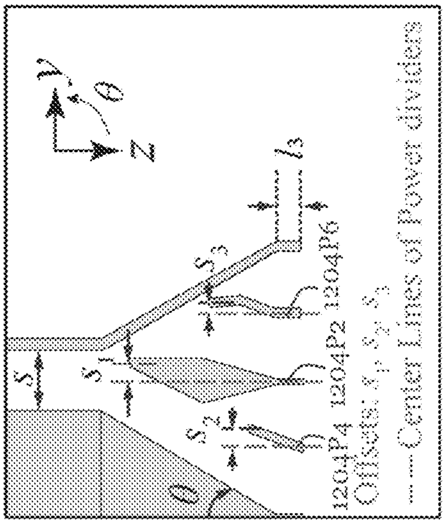
FIG. 13B is an enlarged view of part of the power divider assembly of FIG. 13A.
Figure 13A:
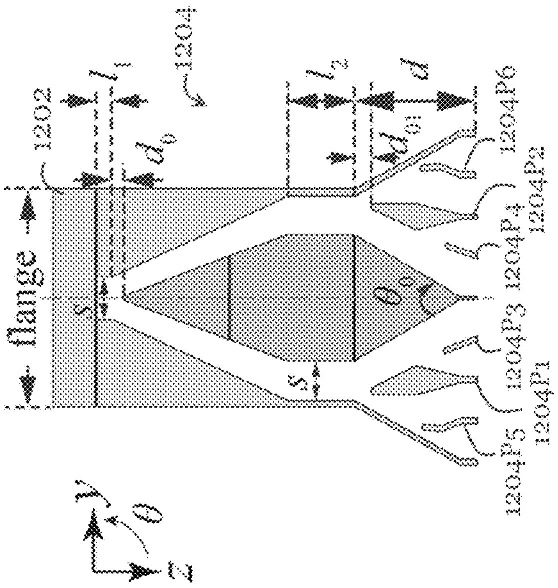
FIG. 13A is an illustration (top view) of the power divider assembly of the horn antenna of FIG. 12.
Figure 13C:
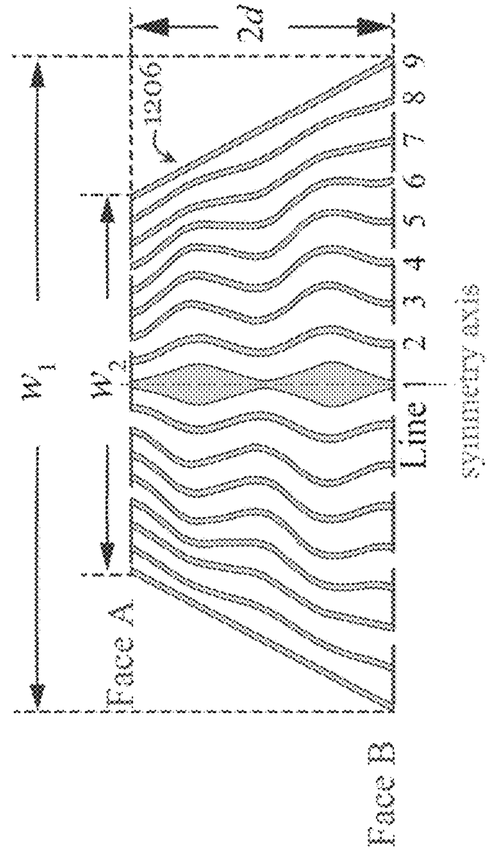
FIG. 13C is an illustration (top view) of a lens of the horn antenna of FIG. 12.

FIGS. 13A to 13C illustrate the design of the horn antenna 1200 in greater detail. FIG. 13A shows the flange 1202 and the power divider assembly 1204. The flange 1202 and the power divider assembly 1204 are generally similar to the flange 302 and the power divider assembly 304 of the embodiment of FIG. 3A. In this embodiment, the flange 1202 includes an opening to the power divider assembly 1204 (as best illustrated in FIG. 12) so that an electromagnetic wave received from the waveguide 1210 can be provided to the power divider assembly 1204. In this embodiment, the power divider assembly 1204 includes a central channel portion, two channel portions branched from the central channel portion and symmetrically disposed about the axis of symmetry (e.g., collinear or parallel to the axis of symmetry of the lens 1206), and six power dividers 1204P1, 1204P2, 1204P3, 1204P4, 1204P5, 1204P6 at the outlet of each of the two branched channel portions. More specifically, the power dividers 1204P1, 1204P2 are arranged at the outlet of each of the two branched channel portions to provide four channel portions, and the power dividers 1204P3, 1204P4, 1204P5, 1204P6 are further arranged at the outlet of each of the four channel portions, to provide eight channel portions with different power ratios connected with the lens 1206. As shown in FIG. 13B, the leading end or edge of each of the power dividers 1204P1, 1204P2 has a respective offset $s_1$ away from the symmetry axis and relative to a centerline of the corresponding one of their upstream channel portions; the leading end or edge of each of the power dividers 1204P3, 1204P4 has a respective offset $s_2$ away from the symmetry axis and relative to a centerline of the corresponding one of their upstream channel portions; and the leading end or edge of each of the power dividers 1204P5, 1204P6 has a respective offset $s_3$ away from the symmetry axis and relative to a centerline of the corresponding one of their upstream channel portions. FIG. 13C shows the lens 1206 with non-linear channels, which is generally the same as lens 100, 306, hence is not described again. In this embodiment, the power divider assembly 1204 can provide an electromagnetic wave with tapered E-field distribution at the input (face A) of the lens 1206.

Figure 14:
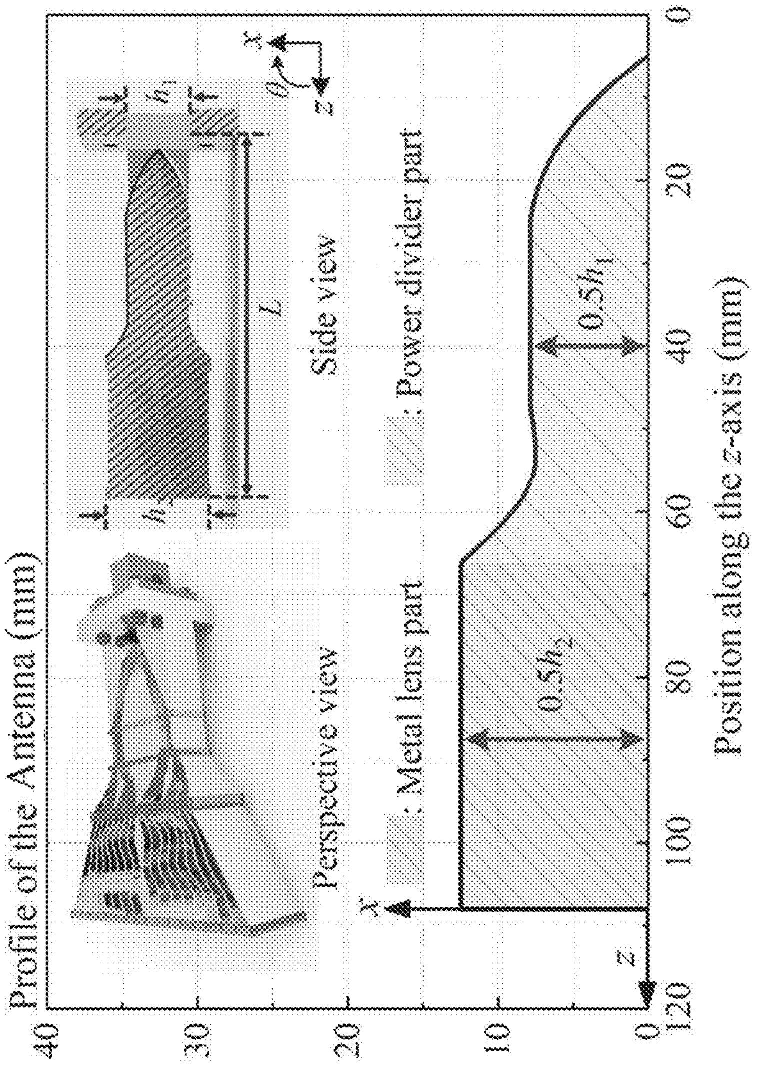
FIG. 14 is an illustration of the horn antenna of FIG. 12 and a graph of the height profile of the horn antenna of FIG. 12.

FIG. 14 shows the perspective and side views of the antenna 1200 along with the height profile (the upper half is shown, the lower half is the same as the upper half) of the antenna 1200. As shown in FIG. 14, along the z-direction (the general elongation direction or long axis of the antenna 1200), the opening formed in the flange 1202 has a height $h_1$, the power divider assembly 1204 has a varying height, and the lens 1206 has a generally constant height $h_2$ of 25 mm. The varying height of the power divider assembly 1204 is arranged to reduce the side-lobe level of the antenna 1200. As shown in FIG. 14, the power divider assembly 1204 includes a first portion with a varying height from 0 to $h_1$, a second portion with generally the same height $h_1$, and a third portion transitioning from height $h_1$ to height $h_2$, wherein the first portion is closer to the flange 1202 than the second portion, and the second portion is closer the flange 1202 than the third potion.

The values of the parameters of the antenna 1200 in this embodiment are shown in Table III.

TABLE III

| Parameters of the antenna 1200 | | | | | |
|---|---|---|---|---|---|
| flange | θ | L | $l_1$ | $l_2$ | $l_3$ |
| 40.0 mm | 60° | 108.0 mm | 3.0 mm | 12.0 mm | 3.0 mm |
| d | $d_0$ | $d_{01}$ | $w_0$ | $w_1$ | $w_2$ |
| 19.4 mm | 2.0 mm | 3.0 mm | 1.0 mm | 106.0 mm | 59.7 mm |
| s | $s_1$ | $s_2$ | $s_3$ | $h_1$ | $h_2$ |
| 7.9 mm | 2.0 mm | 2.2 mm | 1.0 mm | 15.8 mm | 25.0 mm |

As mentioned, the design of antenna 1200 is generally the same as the design of antenna 300, 900, and that the antenna 1200 is different from the antenna 900 in that modifications are made to suppress the H-plane side-lobe level. Specifically, in antenna 1200, the height of the lens 1206 is greater than the height of the power divider assembly 1204 and the power divider assembly includes a generally smooth height transition to the lens 1206. This arrangement can help to restore the impedance matching affected by the varying height profile of the power divider assembly 1204. Also, in antenna 1200, the design of the power divider assembly 1204 has been modified as described above to suppress the E-plane side-lobe level.

A parametric study is performed to investigate the effect of varying the height profile in the antenna 1200.

Figure 15:
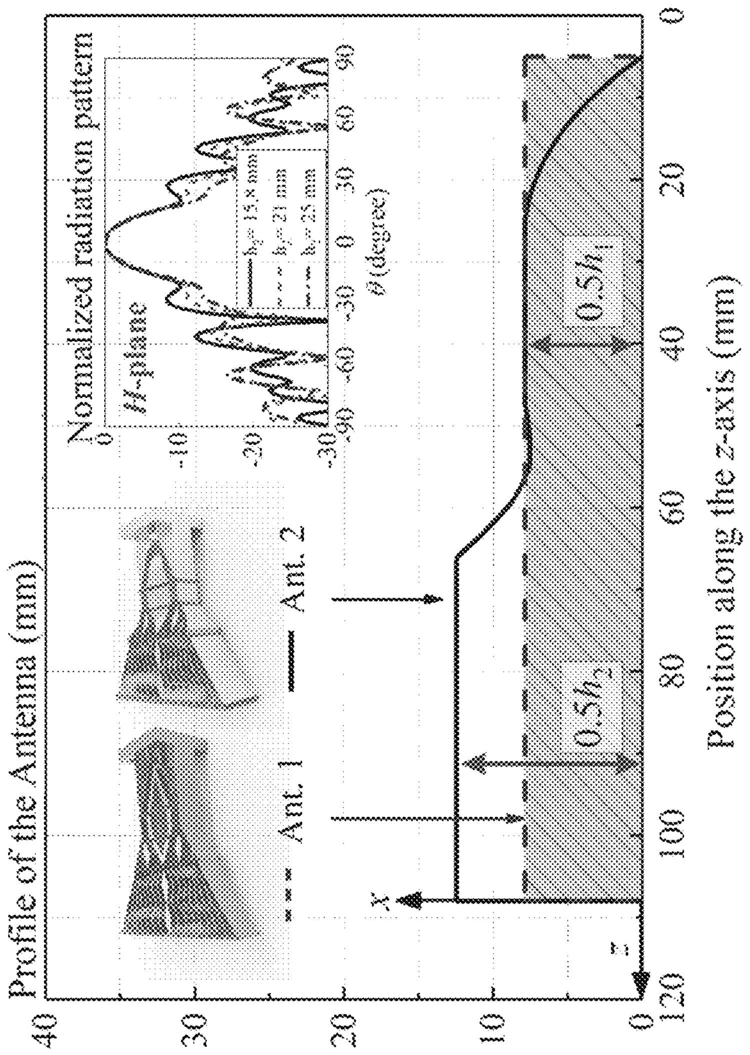
FIG. 15 is a graph showing the height profile of the horn antenna of FIG. 9C and the horn antenna of FIG. 12, as well as their associated H-plane radiation patterns at 15 GHz.

FIG. 15 shows the difference in the height profile between the antenna 1200 and the antenna 900. As shown in FIG. 15, the antenna 1200 ("Ant.2") has a smoother height profile and a larger aperture (outlet of the lens) size of $h_2$. FIG. 15 also shows the H-plane radiation patterns of the antenna 1200 at 15 GHz for different values of $h_2$.

Figure 16:
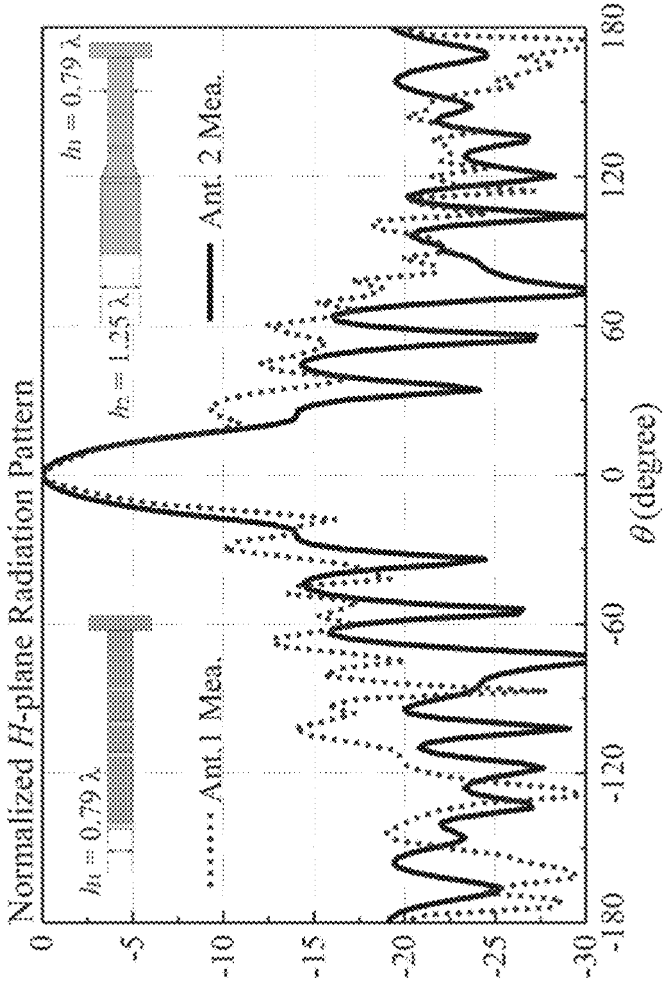
FIG. 16 is a graph showing measured (normalized) H-plane radiation patterns of the horn antenna of FIG. 9C and the horn antenna of FIG. 12.

FIG. 16 shows the measured normalized H-plane radiation patterns of the antenna 1200 and the antenna 900. As shown in FIG. 16, the side-lobe level decreases from less than −10 dB to about −15 dB when $h_2$ increases from $h_1$=0.79λ (15.8 mm at 15 GHz, "Ant.1") to 1.25λ (25 mm at 15 GHz, Ant.2").

The effect of the power divider assembly 1204 in the antenna 1200 (as compared with the power divider assembly in the antenna 900) on the x-y plane E-field distribution is considered.

Figures 17A, 17B:
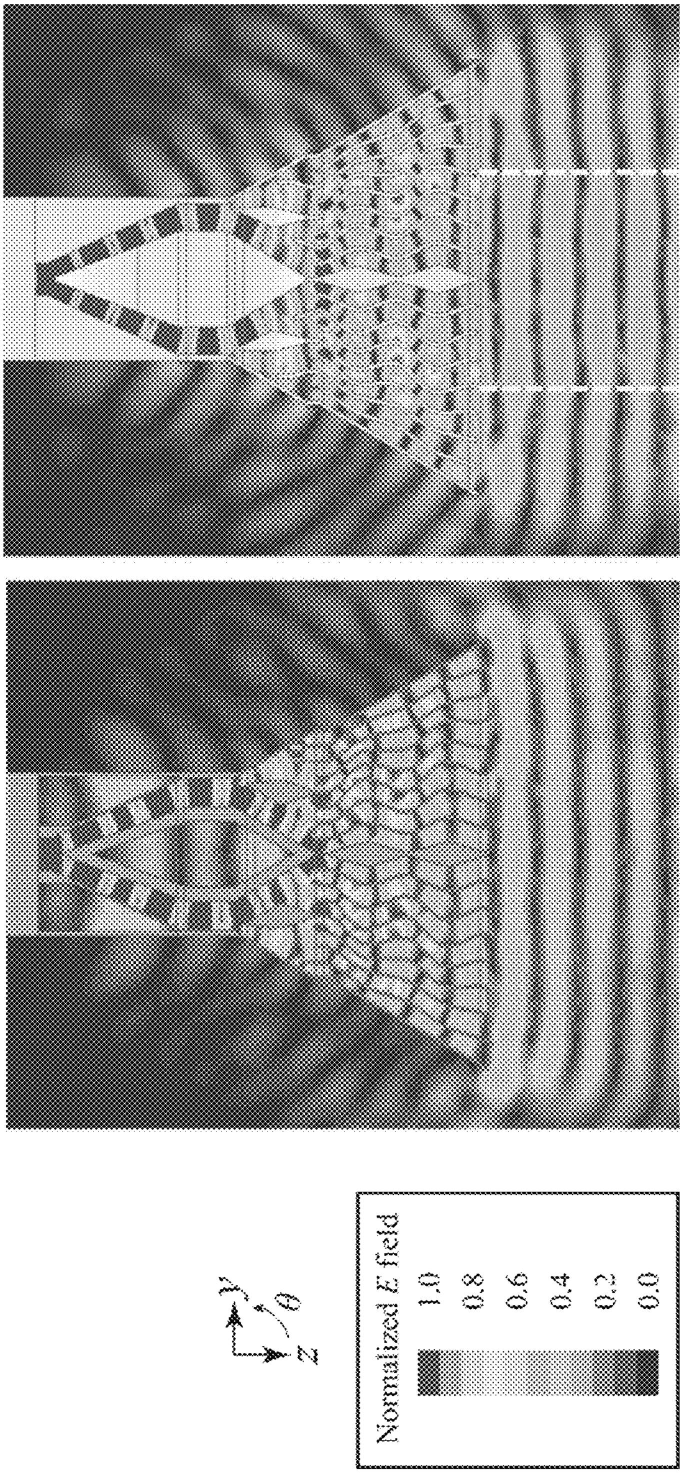
FIG. 17A is a plot showing simulated (normalized) electric field distribution in the horn antenna of FIG. 9C at 15 GHz.
FIG. 17B is a plot showing simulated (normalized) electric field distribution in the horn antenna of FIG. 12 at 15 GHz.

FIG. 17A shows simulated E-field distributions of the antenna 900 ("Ant.1") whereas FIG. 17B shows simulated E-field distributions of the antenna 1200 ("Ant.2"), both at 15 GHz. As seem from these Figures, the magnitude distribution of the antenna 900 is more uniform than that of the antenna 1200.

Figure 18:
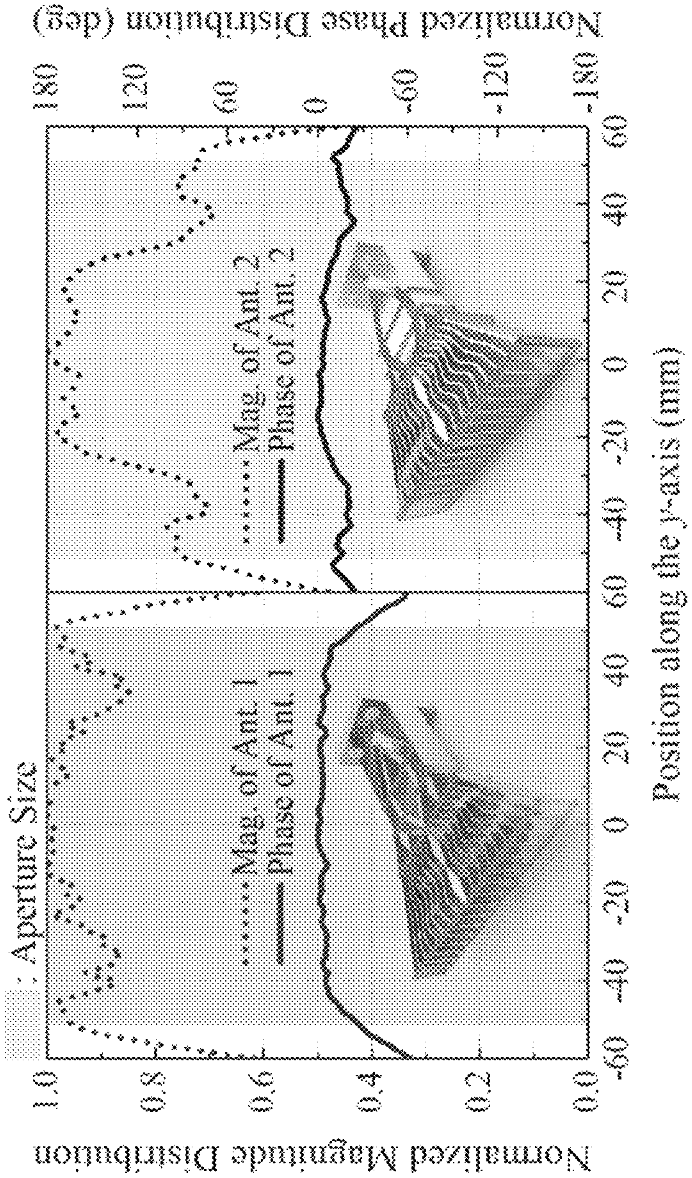
FIG. 18 is a plot showing simulated electric field distributions at the aperture of the horn antenna of FIG. 9C and at the aperture of the horn antenna of FIG. 12.

The radiation pattern is determined by the aperture field (i.e., the electromagnetic wave field at the output aperture of the lens). FIG. 18 shows the simulated electric field distributions at the output aperture of the antenna 900 ("Ant.1") in the z-y plane and the simulated electric field distributions at the output aperture of the antenna 1200 ("Ant.2") in the z-y plane, both at 15 GHz. As shown in FIG. 18, the E-field magnitude of antenna 900 is generally more uniform than that of the antenna 1200 because the antenna 1200 has a tapered E-field distribution as expected.

Figure 19:
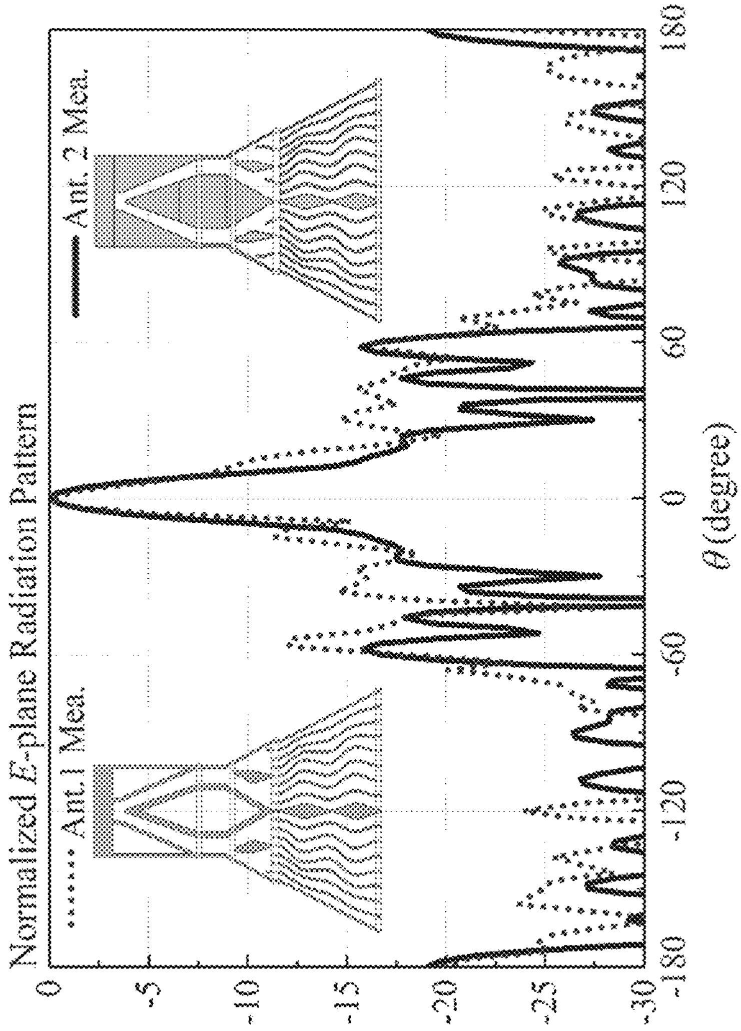
FIG. 19 is a plot showing measured (normalized) electric field radiation patterns of the horn antenna of FIG. 9C and the horn antenna of FIG. 12.

FIG. 19 shows the measured normalized E-plane radiation patterns of the antenna 900 ("Ant.1") and the antenna 1200 ("Ant.2") at 15 GHz. As shown in FIG. 19, the use of the tapered magnitude distribution in antenna 1200 can effectively decrease the side-lobe level when compared with antenna 900.

In addition to suppressing the side-lobe level, the antenna 1200 can also improve the antenna gain, stability, and bandwidth by optimizing the metal lens 1206.

Figure 20:
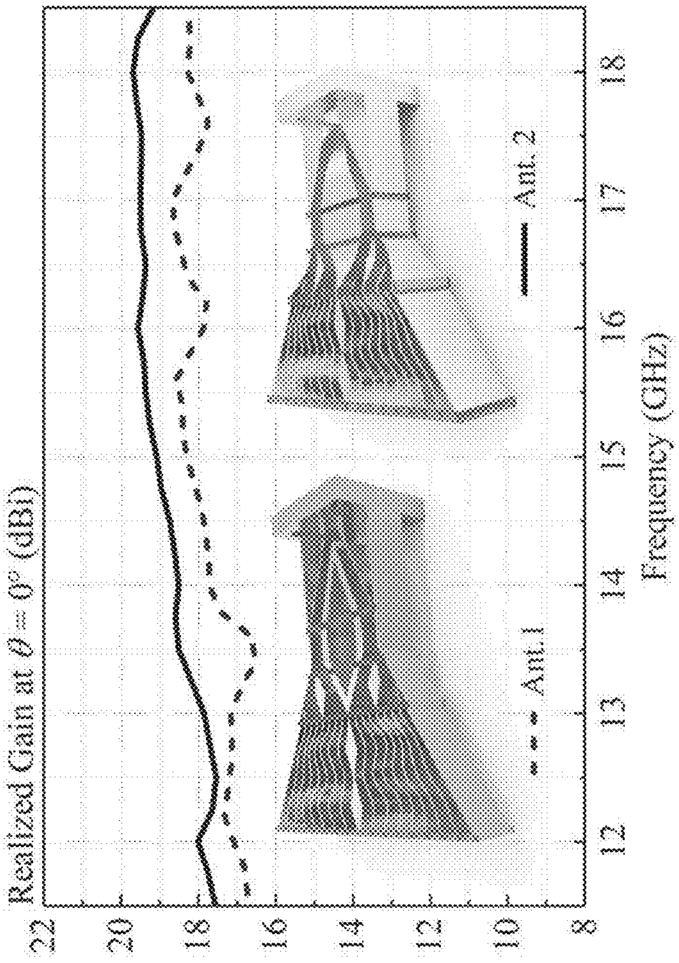
FIG. 20 is a plot showing simulated realized gains (at $\theta=0°$) of the horn antenna of FIG. 9C and the horn antenna of FIG. 12.

FIG. 20 shows the simulated realized gains (at θ=0°) of the antenna 900 ("Ant.1") and the antenna 1200 ("Ant.2"). With reference to FIG. 20, the antenna 1200 has a smaller gain fluctuation, with a 1 dB gain bandwidth of 30.0% (compared with 25.7% of antenna 900).

Figure 21B:
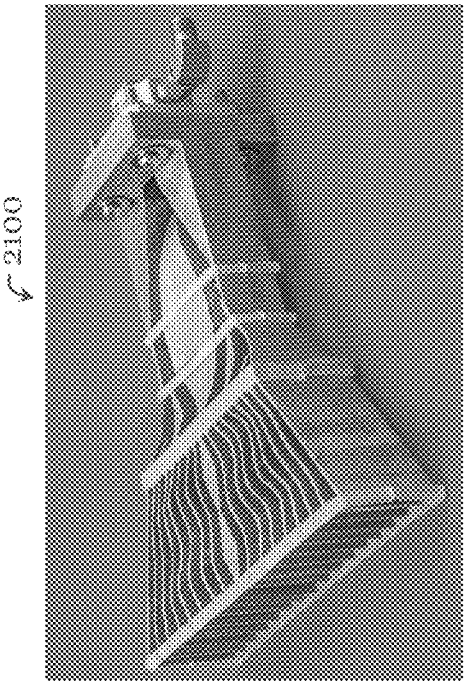
FIG. 21B is a photograph (perspective view) of the prototype of a horn antenna in FIG. 21A.
Figure 21A:
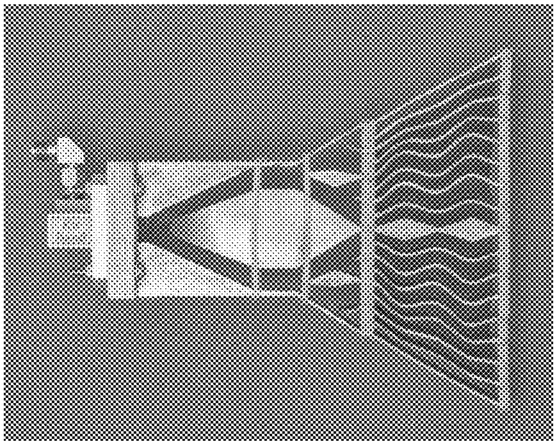
FIG. 21A is a photograph (top view) of the prototype of a horn antenna (fabricated based on the horn antenna of FIG. 12) in one embodiment.

FIGS. 21A and 21B show a prototype horn antenna 2100 (with waveguide, flange, power divider assembly, and lens) made according to the design of the horn antenna 1200. To reduce or avoid the fabrication problems associated with the manufacturing of the prototype antenna 900 (e.g., the spillover and polylactic acid deformation), the prototype antenna 2100 is directly additively manufactured using a conductive material (without using a polymeric skeleton). The flange, power divider assembly, and lens of the antenna 2100 are additively manufactured separately. Four plastic strips, additively manufactured using resin having a dielectric constant of 2.66, are used to secure or support the lens and power divider assembly of the antenna 1200.

Experiments (simulations and measurements) are performed on the fabricated antenna 2100 to verify its performance. In the experiments, the reflection coefficient of the prototype antenna 2100 is measured with a Keysight E8361A network analyzer, and the realized antenna gain and radiation pattern of the prototype antenna 2100 are measured with a Satimo StarLab system.

Figure 22:
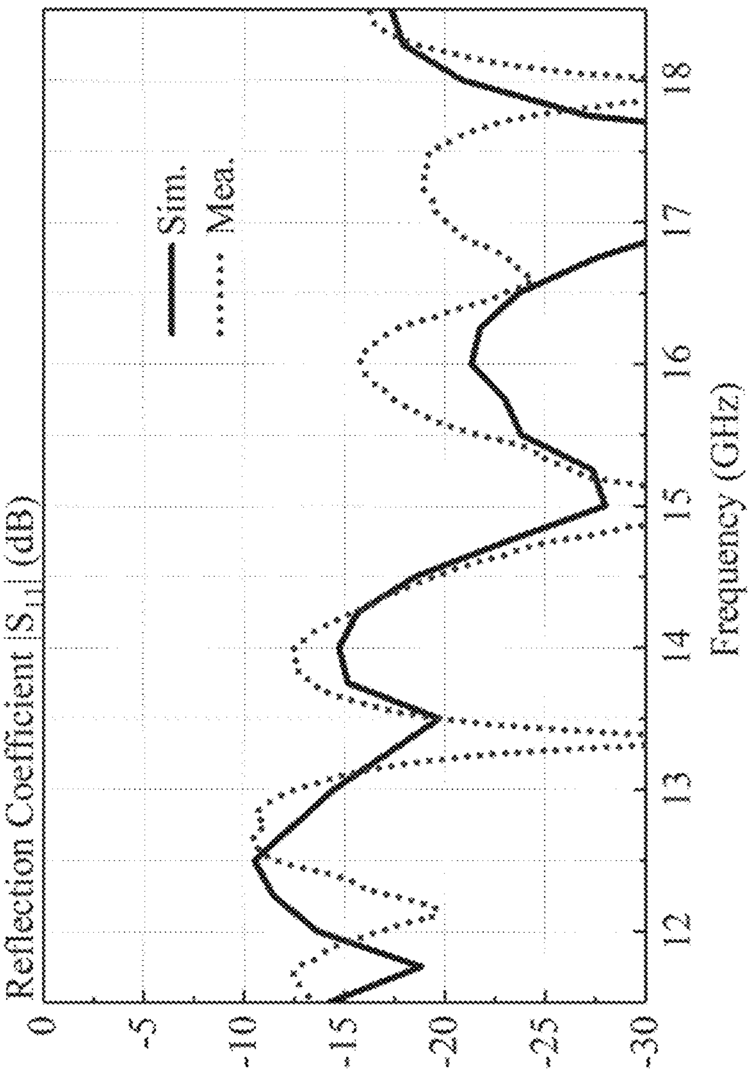
FIG. 22 is a graph showing measured and simulated reflection coefficients ($|S_{11}|$) of the horn antenna of FIG. 21A.

FIG. 22 shows the measured and simulated reflection coefficients ($|S_{11}|$) of the prototype antenna 2100. As shown in FIG. 22, both the measured and simulated −10 dB impedance bandwidths are 46% (in the range of 11.5 GHz to 18.5 GHz).

Figure 23:
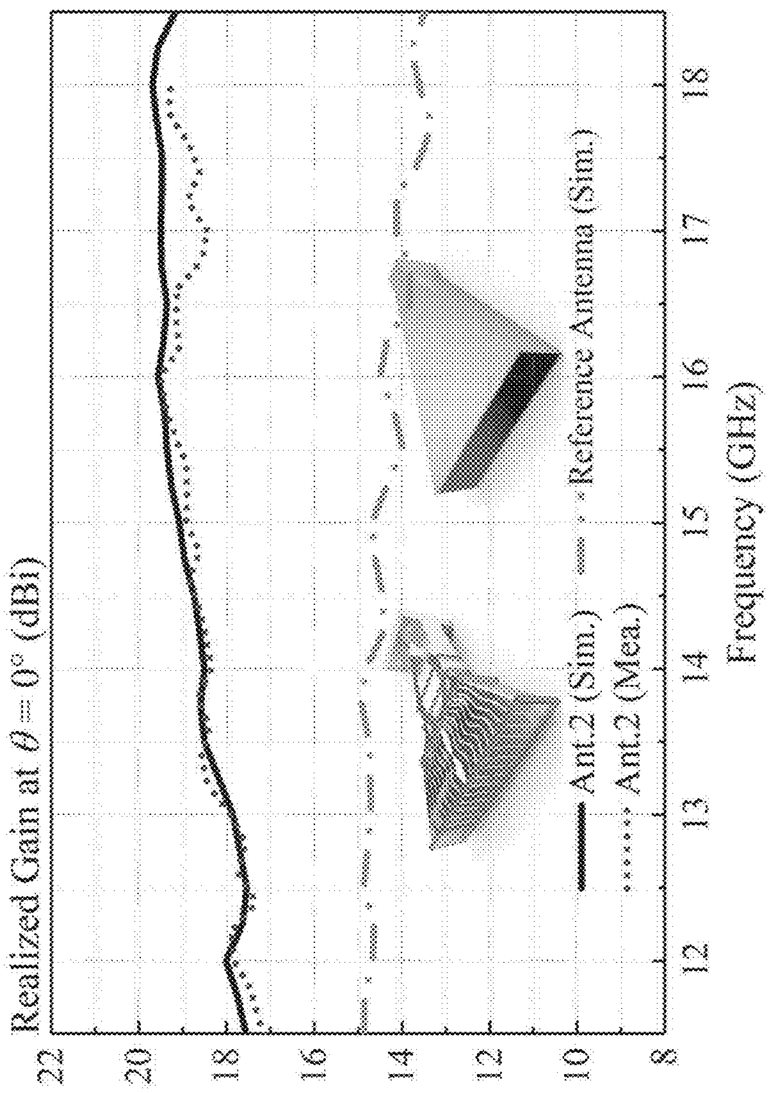
FIG. 23 is a graph showing measured and simulated realized gains (at $\theta=0°$) of the horn antenna of FIG. 21A and a conventional horn antenna (with the same aperture size, focal length, and antenna length as the horn antenna of FIG. 21A)

FIG. 23 shows measured and simulated realized gains (at θ=0°) of the antenna 2100 and a reference antenna. In the measurements, as the operating frequency of the Satimo system is only up to 18 GHz, the frequency range of 11.5 GHz to 18.0 GHz is considered. FIG. 23 shows reasonable agreement between the measured and simulated realized gains for the antenna 2100. In FIG. 23, the reference antenna is a conventional horn antenna with the same aperture size, focal length, and antenna length as antenna 2100 and its performance is simulated for comparison. As shown in FIG. 23, the simulated realized gain of the antenna 2100 is higher than that of the reference horn antenna by more than 3 dB. At 18 GHz, the gain difference is as high as 6.3 dB. The antenna 2100 has a measured peak realized gain of 19.1 dBi at 15 GHz and an aperture efficiency of 97.71% (calculated using the measured gain as performed for antenna 900). While this aperture efficiency is smaller than that of antenna 900 (109.3%), it is better than some existing designs. The measured gain fluctuation is less than 3 dB across the entire impedance passband (in the range of 11.5 GHz to 18.0 GHz), with a measured 1 dB gain bandwidth of 30% (in the range of 13.3 GHz to 18.0 GHz).

Figure 24A:
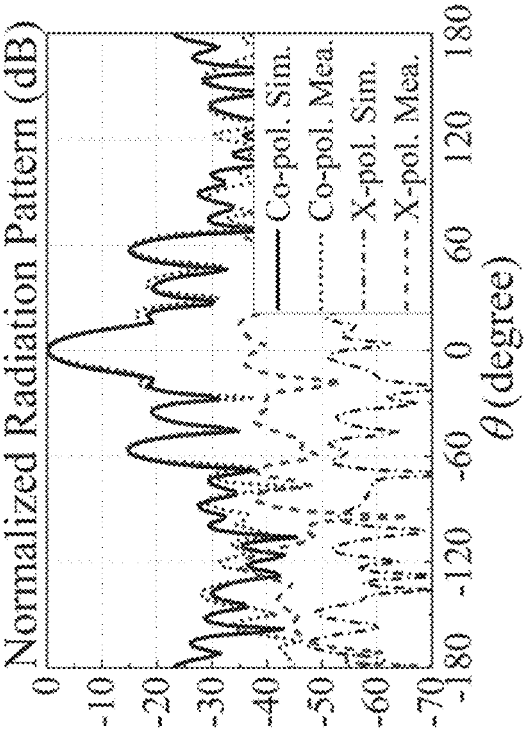
FIG. 24A is a graph showing measured and simulated (normalized) radiation patterns of the horn antenna of FIG. 21A in the E-plane (x-y plane) at 12 GHz.
Figure 24B:
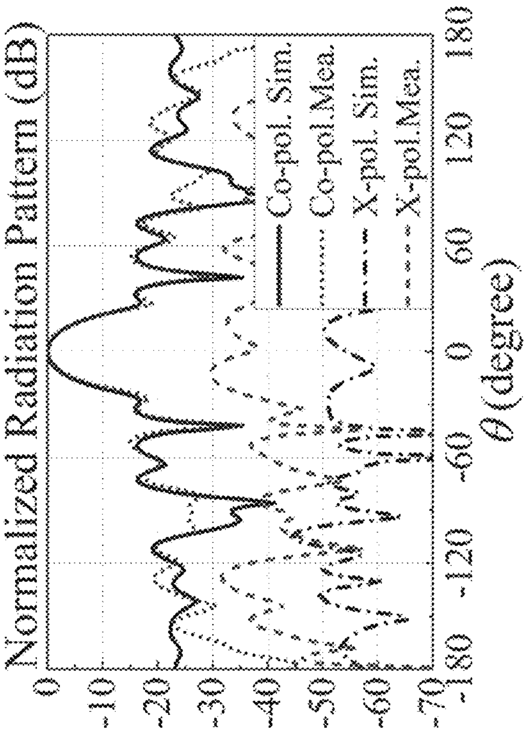
FIG. 24B is a graph showing measured and simulated (normalized) radiation patterns of the horn antenna of FIG. 21A in the H-plane (x-z plane) at 12 GHz.
Figure 25A:
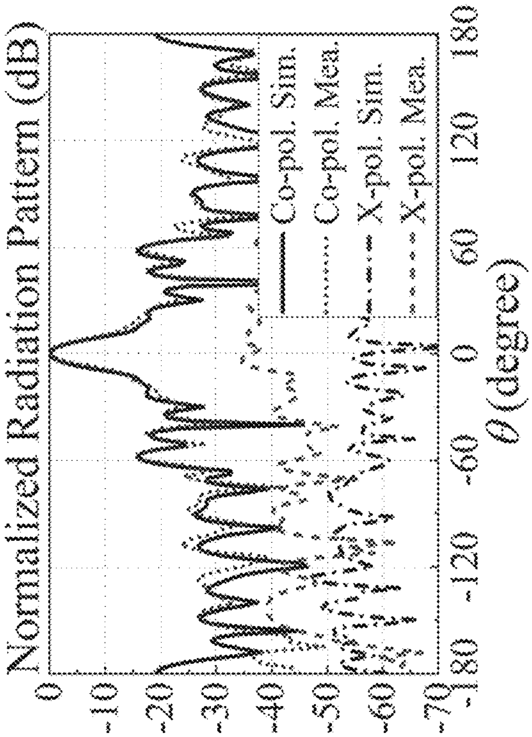
FIG. 25A is a graph showing measured and simulated (normalized) radiation patterns of the horn antenna of FIG. 21A in the E-plane (x-y plane) at 15 GHz.
Figure 25B:
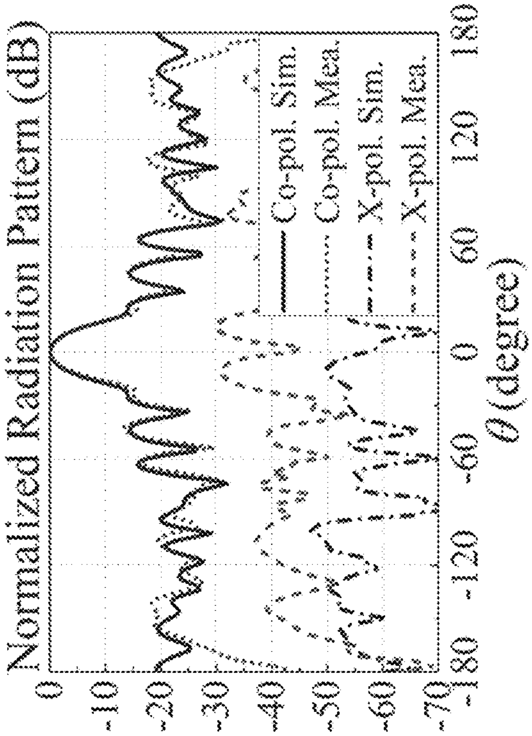
FIG. 25B is a graph showing measured and simulated (normalized) radiation patterns of the horn antenna of FIG. 21A in the H-plane (x-z plane) at 15 GHz.
Figure 26B:
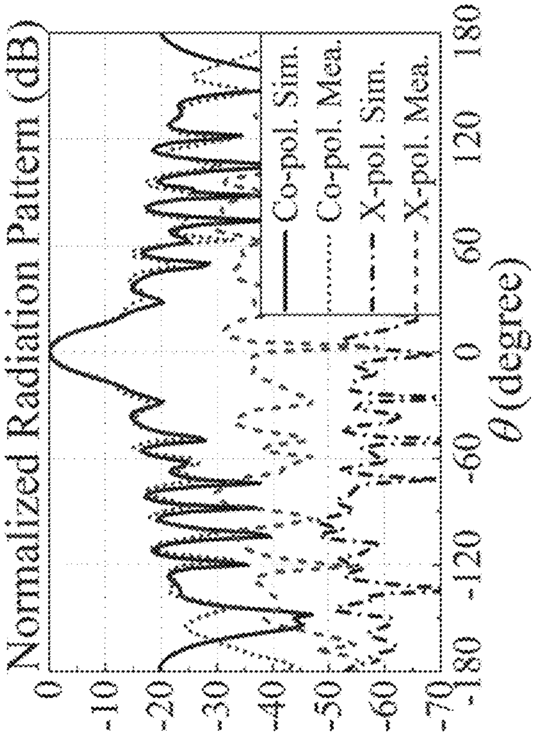
FIG. 26B is a graph showing measured and simulated (normalized) radiation patterns of the horn antenna of FIG. 21A in the H-plane (x-z plane) at 18 GHz.
Figure 26A:
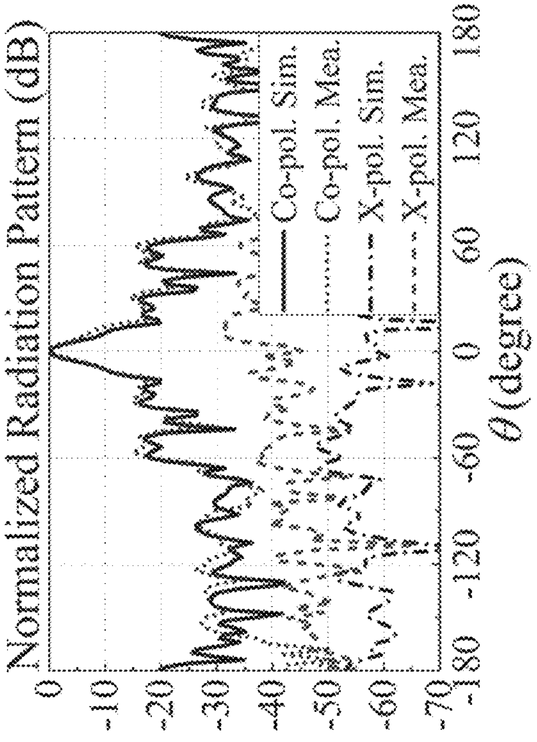
FIG. 26A is a graph showing measured and simulated (normalized) radiation patterns of the horn antenna of FIG. 21A in the E-plane (x-y plane) at 18 GHz.

FIGS. 24A to 26B show measured and simulated normalized radiation patterns of the antenna 2100. Specifically, FIGS. 24A and 24B show measured and simulated (normalized) radiation patterns of the antenna 2100 in the E-plane (x-y plane) and in the H-plane (x-z plane) respectively at 12 GHz; FIGS. 25A and 25B show measured and simulated (normalized) radiation patterns of the antenna 2100 in the E-plane (x-y plane) and in the H-plane (x-z plane) respectively at 15 GHz; and FIGS. 26A and 26B show measured and simulated (normalized) radiation patterns of the antenna 2100 in the E-plane (x-y plane) and in the H-plane (x-z plane) respectively at 18 GHz.

As shown in FIGS. 24A to 26B, generally stable radiation patterns can be observed across the frequency band. By using the tapered electric field magnitude distribution, the side-lobe level is less than −15 dB.

Table IV shows simulated and measured realized gain and half-power beamwidth (HPBW) of the antenna 2100. As shown in the Table IV, the measured half-power beamwidth slightly decreases as the frequency increases, which is not unexpected as the antenna gain slightly increases with an increase in the frequency as found in FIG. 23.

TABLE IV

Measured and simulated realized gains and half-power beamwidths (HPBWs) across impedance passband of the antenna 2100

| Frequency (GHz) | | 12 | 15 | 18 |
|---|---|---|---|---|
| Realized gain (dB) | Simulation | 18.0 | 19.1 | 19.7 |
| | Measurement | 17.8 | 18.9 | 19.3 |
| HPBW (E-plane) | Simulation | 13.1° | 10.6° | 8.8° |
| | Measurement | 13.0° | 10.5° | 8.4° |
| HPBW (H-plane) | Simulation | 25.7° | 20.8° | 18.3° |
| | Measurement | 25.2° | 20.6° | 18.2° |

Table V shows the performances of the horn antenna embodiments described above, including the antenna 300, 900 and the antenna 1200, 2100.

TABLE V

Performance of the illustrated antenna embodiments

| Antenna | Type | f (GHz) | F (λ) | Aperture ($\lambda^2$) | Realized gain (dB) | Side-lobe level (dB) | 1 dB gain bandwidth | 3 dB gain bandwidth | Aperture efficiency |
|---|---|---|---|---|---|---|---|---|---|
| 300, 900 ("Ant. 1", measured) | Metal lens | 15.0 | 5.40 | 4.19 | 17.6 | −9.0 | 25.7% | >46.7% | 109.3% |
| 1200, 2100 ("Ant. 2", measured) | Metal lens | 15.0 | 5.40 | 6.62 | 19.1 | −15.0 | 30.0% | >46.7% | 97.7% |

Note:
the antenna dimensions, realized gain and aperture efficiency are all calculated at the center frequency point of reference operating band.

The invention has provided, in general, a lens for a horn antenna and a horn antenna including the lens. In some embodiments, there is provided a compact wideband horn antenna with a metal lens operable as an H-plane metal lens. The antenna can provide a generally uniform E-field distribution at the radiating aperture, provide a high realized gain, a high aperture efficiency, and/or has a compact size. The use of a metal lens can generally handle higher power than dielectric lens or metasurface. In some embodiments, there is provided a compact wideband horn antenna with a lower side-lobe level, e.g., by introducing a tapered E-field distribution at the input of the metal lens of the antenna. In some embodiments, the antenna includes a spatial power divider and an H-plane metal lens, both of which can be metallic and fabricated at least partly by additive manufacturing. In some embodiments, the non-linear channels of the lens have different lengths to convert the original quasi-cylindrical wavefront into a nearly planar wavefront across a wide frequency range to give a wideband high-gain antenna. Some embodiments of the invention provide a horn antenna with a metal lens. In some examples, the magnitude- and phase-distributions of the electromagnetic wave are separately controlled by different parts of the antenna.

Some embodiments of the invention have provided a gain-enhancing method for a horn antenna. The horn antenna incorporates a wideband lens made at least partly of metal. This metal lens may include multiple channels that have substantially the same path length. The shapes, forms, sizes, etc., of the channels can be designed to obtain desired phase and/or magnitude distributions at the radiating aperture of the lens or antenna. The lens may increase aperture efficiency and/or realized gain of the horn antenna. In some embodiments, the flare angle and focal length of the lens can be different from those specifically illustrated. In some embodiments the channels of the lens can be of a different wavy shape, such as a wavy shape based on sine function, parabola function, square function, triangular function, sawtooth function, etc. In some embodiments the total number of channels in the lens may be different from those illustrated. In some embodiments the plates and/or channels need not be symmetrically disposed about an axis.

In some embodiments, there is provided a horn antenna with generally uniform E-field distribution at the radiating aperture. Such horn antenna may include a metal lens and an equal-ratio power divider. In some embodiments, there is provided a horn antenna with tapered E-field distribution at the radiating aperture. Such horn antenna may include a metal lens with a generally flared plate assembly including non-linear channels and a different-ratio power divider. In some embodiments, the antennas and/or the gain-enhancing lenses can be made using any kind of metallic material(s), which can be fabricated by additive manufacturing or computer numerical control machining techniques. In some embodiments, the antenna can be fed by SMA or waveguide. In some embodiments, the power divider and metal lens are integrated with the horn antenna. In some embodiments, the operation frequency of the antenna can be different from those specifically illustrated above. In some embodiments, the invention can be applied to an array design.

In one example application, the antenna of the invention can be used for point-to-point wireless communications (e.g. in point-to-point wireless systems) to provide long-range signal coverage. As the antenna in some embodiments may have a compact structure and high gain, in some examples, it be used in applications such as wireless relay communication and satellite communication. In some examples, the lens and/or the antenna may be suitable for $K_u$-band applications.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the summary section above. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention. The shape, form, size, and/or geometry of the lens (e.g., the channels and/or plates) in some embodiments may be different from those specifically disclosed. The plate assembly is generally flared meaning that the extent of widening need not be strictly increasing. The number of channels and/or plates of the lens can be different from those specifically disclosed. One or more of the shape, form, size, etc., of the horn antenna or the lens in some embodiments may be different from those specifically disclosed.

The invention claimed is:

1. A lens for a horn antenna, comprising:

a generally flared plate assembly extending generally along an axis from a first side to a second side opposite the first side, the generally flared plate assembly defining a plurality of non-linear channels that are operable to manipulate an electromagnetic wave received at the first side to provide a manipulated electromagnetic wave at the second side;

each non-linear channel of the plurality of non-linear channels respectively including a first opening at the first side and a second opening at the second side; the first openings of the plurality of non-linear channels separated from each other; the second openings of the plurality of non-linear channels separated from each other; and the plurality of non-linear channels having different linear lengths, but substantially the same physical lengths.

2. The lens of claim 1, wherein the plurality of non-linear channels are arranged such that: when the electromagnetic wave received at the first side comprises a generally planar wavefront, the manipulated electromagnetic wave at the second side comprises a generally planar wavefront.

3. The lens of claim 1, wherein the plurality of non-linear channels are disposed generally symmetrically about the axis.

4. The lens of claim 3, wherein a width of the first opening defined perpendicular to the axis is smaller than a width of the second opening defined perpendicular to the axis.

5. The lens of claim 4, wherein the plurality of non-linear channels comprises:

a first plurality of non-linear channels arranged on one side of the axis; and a second plurality of non-linear channels arranged on another side of the axis.

6. The lens of claim 5, wherein for each non-linear channel of the first plurality of non-linear channels, a center of the first opening and a center of the second opening can be connected by a straight line that extends at a non-zero angle to the axis, wherein the straight lines of the first plurality of non-linear channels are arranged at different angles with respect to the axis in such a way that straight line associated with non-linear channel closer to the axis is at a smaller angle to the axis than straight line associated with non-linear channel further away from the axis.

7. The lens of claim 6, wherein the generally flared plate assembly comprise a plurality of plates that define the plurality of non-linear channels, the plurality of plates comprises:

a first plate extending at a non-zero angle to the axis, a second plate extending a non-zero angle to the axis, and a plurality of intermediate plates arranged between the first plate and the second plate;

wherein the first plate and the second plate together define a first width perpendicular to the axis on the first side and a second width perpendicular to the axis on the second side; and wherein the first width is smaller than the second width.

8. The lens of claim 7, wherein each of the plurality of intermediate plates respectively includes:

a first end arranged at the first side, a second end at the second side, a first surface extending between the first and second ends, and a second surface opposite the first surface and extending between the first and second ends.

9. The lens of claim 8, wherein the first surface of each of the plurality of intermediate plates comprises a wavy surface; and wherein the second surface of each of the plurality of intermediate plates comprises a wavy surface.

10. The lens of claim 9, wherein for at least some of the plurality of intermediate plates, the wavy surfaces of the same intermediate plate have generally the same wavy shape.

11. The lens of claim 10, wherein for at least some of the plurality of intermediate plates, the wavy surfaces of different intermediate plates have different wavy shapes.

12. The lens of claim 11, wherein the wavy surfaces are defined by a cosine-based function $f_n(x)=\alpha_n \cos(\omega_n x)$, where n is an identifier of the intermediate plate, $\alpha_n$ is amplitude, $\omega_n$ is angular frequency.

13. The lens of claim 8, wherein the first ends of the plurality of intermediate plates are arranged on substantially a same first plane that is arranged generally perpendicular to the axis, wherein the second ends of the plurality of intermediate plates are arranged on substantially a same second plane that is arranged generally perpendicular to the axis, and wherein the first and second planes are generally parallel.

14. The lens of claim 8, wherein each of the plurality of intermediate plates respectively further includes:

a third end extending between the first and second ends, and a fourth end opposite the third end and extending between the first and second ends.

15. The lens of claim 14, wherein the third ends of the plurality of intermediate plates are arranged on substantially a same first third plane that is parallel to the axis, wherein the fourth ends of the plurality of intermediate plates are arranged on substantially a same fourth plane that is parallel to the axis, and wherein the same third plane and the same fourth plane are generally parallel.

16. The lens of claim 14, wherein for each of the plurality of intermediate plates, a distance between the third and fourth ends defines a height of the intermediate plate, and wherein the heights of intermediate plates are generally the same.

17. The lens of claim 9, wherein the first surface of each of the plurality of intermediate plates is a metallic surface; and wherein the second surface of each of the plurality of intermediate plates is a metallic surface.

18. The lens of claim 7, wherein the plurality of plates are made entirely of metal.

19. The lens of claim 7, further comprising a support for supporting the plurality of plates in place.

20. The lens of claim 1, wherein the generally flared plate assembly defines an envelope shaped generally as a trapezoidal prism with a short base at the first side and a long base at the second side.

21. A horn antenna comprising:

a lens of claim 1; and a power divider assembly operably connected with the lens.

22. The horn antenna of claim 21, further comprising:

a waveguide; and a flange connected between the waveguide and the power divider assembly.

23. The horn antenna of claim 21, wherein the power divider assembly comprises one or more power dividers arranged to manipulate an electromagnetic wave from a source to provide a manipulated electromagnetic wave to the lens.

24. The horn antenna of claim 21, wherein the power divider assembly and the lens extend generally along the axis of the generally flared plate assembly, wherein the lens defines a first height perpendicular to the axis, wherein the power divider assembly defines a second height perpendicular to the axis, and wherein the first height and the second height are substantially the same.

25. The horn antenna of claim 21, wherein the power divider assembly and the lens extend generally along the axis of the generally flared plate assembly, wherein the lens has a first height perpendicular to the axis, and wherein the power divider assembly has a first portion with a second height smaller than the first height and perpendicular to the axis, and a second portion transitioning from the first portion to the lens.

26. The horn antenna of claim 25, wherein the second portion is a generally flared portion flaring along the axis and generally perpendicular to the flaring of the generally flared plate assembly along the axis.

27. A lens for a horn antenna, comprising:

a generally flared plate assembly extending generally along an axis from a first side to a second side opposite the first side, the generally flared plate assembly defining a plurality of non-linear channels that are operable to manipulate an electromagnetic wave received at the first side to provide a manipulated electromagnetic wave at the second side;

wherein each non-linear channel of the plurality of non-linear channels respectively including a first opening at the first side;

a second opening at the second side;

a third opening at a third side that is adjacent to both the first side and the second side; and a fourth opening at a fourth side that is adjacent to both the first side and the second side; the fourth side being opposite to the third side;

wherein each one of the first, second, third and fourth openings of each non-linear channel of the plurality of non-linear channels, is separated from a corresponding one of the first, second, third and fourth openings of an adjacent non-linear channel.

* * * * *